(12) United States Patent
Tarsa et al.

(10) Patent No.: US 10,938,744 B2
(45) Date of Patent: Mar. 2, 2021

(54) SIMPLIFIED LOW PROFILE MODULE WITH LIGHT GUIDE FOR PENDANT, SURFACE MOUNT, WALL MOUNT AND STAND ALONE LUMINAIRES

(71) Applicant: Ideal Industries Lighting LLC, Durham, NC (US)

(72) Inventors: Eric J. Tarsa, Goleta, CA (US); Hormoz Benjamin, Moorpark, CA (US); Bernd P. Keller, Santa Barbara, CA (US); Kurt S. Wilcox, Libertyville, IL (US); Zongjie Yuan, Grayslake, IL (US)

(73) Assignee: Ideal Industries Lighting LLC, Sycamore, IL (US)

( * ) Notice: Subject to any disclaimer, the term of this patent is extended or adjusted under 35 U.S.C. 154(b) by 95 days.

(21) Appl. No.: 16/276,772

(22) Filed: Feb. 15, 2019

(65) Prior Publication Data

US 2019/0190850 A1    Jun. 20, 2019

Related U.S. Application Data

(60) Division of application No. 14/101,129, filed on Dec. 9, 2013, now Pat. No. 10,234,616, and a
(Continued)

(51) Int. Cl.
*F21S 8/06* (2006.01)
*H04L 12/933* (2013.01)
(Continued)

(52) U.S. Cl.
CPC .............. *H04L 49/103* (2013.01); *F21K 9/61* (2016.08); *F21S 8/06* (2013.01); *F21S 8/061* (2013.01);
(Continued)

(58) Field of Classification Search
CPC ................ F21K 9/61; F21S 8/061; F21S 8/06
See application file for complete search history.

(56) References Cited

U.S. PATENT DOCUMENTS

| 3,532,871 A | 10/1970 | Shipman |
| 4,146,297 A | 3/1979 | Alferness et al. |

(Continued)

FOREIGN PATENT DOCUMENTS

| DE | 3812764 | 10/1989 |
| DE | 20014114 | 12/2000 |

(Continued)

OTHER PUBLICATIONS

Web page at http://www.fusionoptix.com/lighting/components/array-optics.htm, printed May 9, 2013 (2 pages).
(Continued)

*Primary Examiner* — Evan P Dzierzynski
(74) *Attorney, Agent, or Firm* — Myers Bigel, P.A.

(57) ABSTRACT

A luminaire having a waveguide suspended beneath a mounting element, the waveguide has a first surface proximal to the mounting element, a second surface distal to the mounting element, and an edge between the first and the second surfaces. At least one cavity extends into the waveguide from the first surface to the second surface. A LED component is coupled to the waveguide so as to emit light into the cavity. LED support structures are also disclosed.

19 Claims, 11 Drawing Sheets

Related U.S. Application Data continuation-in-part of application No. 13/842,521, filed on Mar. 15, 2013, now Pat. No. 9,519,095, and a continuation-in-part of application No. 13/839,949, filed on Mar. 15, 2013, now Pat. No. 9,581,751, and a continuation-in-part of application No. 13/841,074, filed on Mar. 15, 2013, now Pat. No. 9,625,638, and a continuation-in-part of application No. 13/840,563, filed on Mar. 15, 2013, now Pat. No. 10,436,969, and a continuation-in-part of application No. 13/938,877, filed on Jul. 10, 2013, now Pat. No. 9,389,367.

(60) Provisional application No. 61/758,660, filed on Jan. 30, 2013.

(51) Int. Cl.

| | | |
|---|---|---|
| *F21V 7/00* | (2006.01) | |
| *F21V 8/00* | (2006.01) | |
| *F21V 29/70* | (2015.01) | |
| *F21V 29/74* | (2015.01) | |
| *F21K 9/61* | (2016.01) | |
| *F21Y 113/10* | (2016.01) | |
| *F21Y 115/10* | (2016.01) | |
| *F21Y 113/00* | (2016.01) | |
| *H04L 12/937* | (2013.01) | |
| *H04L 12/935* | (2013.01) | |
| *H04L 12/931* | (2013.01) | |

(52) U.S. Cl.
CPC ............ *F21V 7/005* (2013.01); *F21V 7/0091* (2013.01); *F21V 29/70* (2015.01); *F21V 29/74* (2015.01); *G02B 6/0025* (2013.01); *H04L 49/15* (2013.01); *F21Y 2113/00* (2013.01); *F21Y 2113/10* (2016.08); *F21Y 2115/10* (2016.08); *G02B 6/002* (2013.01); *G02B 6/0031* (2013.01); *G02B 6/0051* (2013.01); *G02B 6/0085* (2013.01); *H04L 49/254* (2013.01); *H04L 49/3036* (2013.01); *H04L 49/45* (2013.01)

(56) References Cited

U.S. PATENT DOCUMENTS

| | | | |
|---|---|---|---|
| 4,441,787 A | 4/1984 | Lichtenberger | |
| 4,714,983 A | 12/1987 | Lang | |
| 4,977,486 A | 12/1990 | Gotoh | |
| 5,009,483 A | 4/1991 | Rockwell, III | |
| 5,253,317 A | 10/1993 | Allen et al. | |
| 5,613,751 A | 3/1997 | Parker et al. | |
| 5,777,857 A | 7/1998 | Degelmann | |
| 5,812,714 A | 9/1998 | Hulse | |
| 5,897,201 A | 4/1999 | Simon | |
| 6,079,838 A | 6/2000 | Parker et al. | |
| 6,097,549 A * | 8/2000 | Jenkins | F21S 43/239 |
| | | | 359/726 |
| 6,304,693 B1 | 10/2001 | Buelow, II et al. | |
| 6,310,704 B1 | 10/2001 | Dogan et al. | |
| 6,517,222 B1 * | 2/2003 | Orlov | F21S 8/06 |
| | | | 248/325 |
| 6,679,621 B2 | 1/2004 | West et al. | |
| 6,712,481 B2 | 3/2004 | Parker et al. | |
| 6,814,475 B2 | 11/2004 | Amano | |
| 6,924,943 B2 | 8/2005 | Minano et al. | |
| 7,160,015 B2 | 1/2007 | Parker | |
| 7,254,309 B1 | 8/2007 | Chou et al. | |
| 7,400,809 B2 | 7/2008 | Erben et al. | |
| 7,404,660 B2 | 7/2008 | Parker | |
| 7,486,854 B2 | 2/2009 | Van Ostrand et al. | |
| 7,513,672 B2 | 4/2009 | Parker | |
| 7,520,650 B2 | 4/2009 | Smith | |
| 7,665,865 B1 | 2/2010 | Hulse et al. | |
| 7,703,950 B2 | 4/2010 | Ewert et al. | |
| 7,703,967 B2 | 4/2010 | Parker | |
| 7,710,663 B2 | 5/2010 | Barnes et al. | |
| 7,758,227 B1 | 7/2010 | Coleman | |
| 7,766,515 B2 | 8/2010 | Condon et al. | |
| 7,776,236 B2 | 8/2010 | Shih et al. | |
| 7,784,954 B1 | 8/2010 | Coleman | |
| 7,798,695 B2 | 9/2010 | Parker | |
| 7,914,192 B2 | 3/2011 | Coleman | |
| 7,967,477 B2 | 6/2011 | Bloemen et al. | |
| 7,984,999 B2 | 7/2011 | Harbers et al. | |
| 7,991,237 B2 | 8/2011 | Sekiguchi et al. | |
| 7,997,784 B2 | 8/2011 | Tsai | |
| 8,002,450 B2 | 8/2011 | Van Ostrand et al. | |
| 8,033,674 B1 | 10/2011 | Coleman et al. | |
| 8,033,706 B1 | 10/2011 | Kelly et al. | |
| 8,152,352 B2 | 4/2012 | Richardson | |
| 8,162,524 B2 | 4/2012 | Van Ostrand et al. | |
| 8,177,408 B1 | 5/2012 | Coleman | |
| 8,218,920 B2 | 7/2012 | Van Ostrand et al. | |
| 8,231,256 B1 | 7/2012 | Coleman et al. | |
| 8,231,259 B2 | 7/2012 | Keller et al. | |
| 8,249,408 B2 | 8/2012 | Coleman | |
| 8,272,770 B2 | 9/2012 | Richardson | |
| 8,282,261 B2 | 10/2012 | Pance et al. | |
| 8,283,853 B2 | 10/2012 | Yan et al. | |
| 8,297,818 B2 | 10/2012 | Richardson | |
| 8,319,130 B2 | 11/2012 | Lee et al. | |
| 8,393,774 B2 * | 3/2013 | Krijn | F21V 9/45 |
| | | | 362/612 |
| 8,425,071 B2 | 4/2013 | Ruud et al. | |
| 8,434,913 B2 * | 5/2013 | Vissenberg | G02B 6/0021 |
| | | | 362/311.12 |
| 8,454,202 B2 | 6/2013 | Markle et al. | |
| 8,602,611 B2 | 12/2013 | Markle et al. | |
| 8,608,351 B2 | 12/2013 | Peifer | |
| 8,672,518 B2 | 3/2014 | Boomgaarden et al. | |
| 8,696,173 B2 | 4/2014 | Urtiga et al. | |
| 8,820,971 B2 | 9/2014 | Markle et al. | |
| 8,967,844 B2 | 3/2015 | Boomgaarden et al. | |
| 9,081,125 B2 | 7/2015 | Dau et al. | |
| 9,366,396 B2 | 6/2016 | Yuan et al. | |
| 9,442,243 B2 | 9/2016 | Tarsa | |
| 9,568,181 B2 | 2/2017 | Boomgaarden et al. | |
| 10,180,529 B2 * | 1/2019 | Ohno | G02B 6/005 |
| 2004/0057244 A1 | 3/2004 | Amano | |
| 2004/0114361 A1 * | 6/2004 | Severtson | F21V 21/005 |
| | | | 362/219 |
| 2005/0210643 A1 | 9/2005 | Mezei et al. | |
| 2008/0049445 A1 | 2/2008 | Harbers et al. | |
| 2008/0192480 A1 | 8/2008 | Rizkin et al. | |
| 2008/0266900 A1 | 10/2008 | Harbers et al. | |
| 2009/0067170 A1 | 3/2009 | Bloemen et al. | |
| 2009/0073719 A1 | 3/2009 | Parker | |
| 2009/0103293 A1 * | 4/2009 | Harbers | F21V 5/10 |
| | | | 362/231 |
| 2009/0128921 A1 | 5/2009 | Roth | |
| 2009/0129097 A1 | 5/2009 | Ewert et al. | |
| 2010/0027257 A1 | 2/2010 | Boonekamp et al. | |
| 2010/0079843 A1 | 4/2010 | Derichs et al. | |
| 2010/0110673 A1 * | 5/2010 | Bergman | G02B 6/0045 |
| | | | 362/231 |
| 2010/0220484 A1 | 9/2010 | Shani et al. | |
| 2010/0328936 A1 | 12/2010 | Pance et al. | |
| 2011/0242813 A1 | 10/2011 | Markle et al. | |
| 2011/0242814 A1 | 10/2011 | Markle et al. | |
| 2011/0242815 A1 | 10/2011 | Markle et al. | |
| 2011/0299807 A1 | 12/2011 | Kim et al. | |
| 2012/0170316 A1 | 7/2012 | Lee et al. | |
| 2012/0170318 A1 | 7/2012 | Tsai et al. | |
| 2012/0182767 A1 | 7/2012 | Petcavich et al. | |
| 2012/0212957 A1 * | 8/2012 | Hyun | F21V 19/0045 |
| | | | 362/241 |
| 2012/0230019 A1 | 9/2012 | Peifer | |
| 2012/0236595 A1 | 9/2012 | Parker et al. | |
| 2012/0262921 A1 | 10/2012 | Boomgaarden et al. | |
| 2012/0287619 A1 | 11/2012 | Pickard et al. | |
| 2012/0326614 A1 | 12/2012 | Tsuji et al. | |

(56) References Cited

U.S. PATENT DOCUMENTS

| | | | |
|---|---|---|---|
| 2013/0003409 A1* | 1/2013 | Vissenberg | G02B 6/0018 |
| | | | 362/606 |
| 2013/0038195 A1 | 2/2013 | Petroski et al. | |
| 2013/0094213 A1 | 4/2013 | Villard | |
| 2013/0120963 A1 | 5/2013 | Holland et al. | |
| 2013/0265761 A1 | 10/2013 | Kinnune et al. | |
| 2013/0294061 A1 | 11/2013 | Sorensen et al. | |
| 2013/0329424 A1 | 12/2013 | Clark et al. | |
| 2013/0343044 A1 | 12/2013 | Kim et al. | |
| 2014/0104847 A1 | 4/2014 | Boomgaarden et al. | |
| 2014/0133172 A1 | 5/2014 | Vissenberg et al. | |
| 2014/0211457 A1 | 7/2014 | Tarsa et al. | |
| 2014/0313765 A1* | 10/2014 | Nelson | F21S 8/088 |
| | | | 362/555 |
| 2015/0092421 A1 | 4/2015 | Boomgaarden et al. | |
| 2015/0300622 A1 | 10/2015 | Boomgaarden et al. | |
| 2016/0265730 A1 | 9/2016 | Schileo | |

FOREIGN PATENT DOCUMENTS

| | | |
|---|---|---|
| DE | 20107425 | 8/2001 |
| DE | 10047101 | 5/2002 |
| DE | 10203106 | 7/2003 |
| DE | 10302563 | 7/2004 |
| DE | 10302564 | 7/2004 |
| DE | 102006009325 | 9/2007 |
| DE | 102006011296 | 9/2007 |
| DE | 102006013343 | 9/2007 |
| EP | 1503026 | 2/2005 |
| EP | 2784380 | 10/2014 |
| JP | 3161425 | 7/2010 |
| WO | 2008/047278 | 4/2008 |
| WO | 2008/126011 | 10/2008 |
| WO | 2009/130653 | 10/2009 |
| WO | 2009/141778 | 11/2009 |
| WO | 2009/144638 | 12/2009 |

OTHER PUBLICATIONS

U.S. Appl. No. 13/657,421, filed Oct. 22, 2012 (38 pages).
Web page at http://www.oluce.com/en/lamps/table/colombo-281-detail, printed Nov. 19, 2013 (2 pages).
International Search Report and Written Opinion for International Application No. PCT/US2014/013840, dated Jul. 28, 2014, Applicant Cree, Inc. (17 pages).
Invitation to Pay Additional Fees for International Application No. PCT/US2014/013840, dated May 8, 2014, Applicant Cree Inc. (2 pages).
Supplementary European Search Report for Application No. EP 14 74 5897, dated Oct. 5, 2016, Applicant Cree, Inc. (11 pages).
European Examination Report corresponding to European Patent Application No. 14745897.0 (5 pages) (dated Aug. 10, 2020).
Communication Pursuant to Article 94(3), corresponding to European Patent application No. 17779482.3, dated Jun. 16, 2020, 5 pages

* cited by examiner

SIMPLIFIED LOW PROFILE MODULE WITH LIGHT GUIDE FOR PENDANT, SURFACE MOUNT, WALL MOUNT AND STAND ALONE LUMINAIRES

CROSS-REFERENCE TO RELATED PATENT APPLICATIONS

The present application is a divisional application under 35 U.S.C. § 120 of U.S. patent application Ser. No. 14/101,129, filed Dec. 9, 2013, which in turn claims the benefit of U.S. Provisional Patent Application No. 61/758,660, filed Jan. 30, 2013. The present application also is a continuation-in-part of U.S. patent application Ser. No. 13/842,521, filed Mar. 15, 2013; and is a continuation-in-part of U.S. patent application Ser. No. 13/839,949, filed Mar. 15, 2013; and is a continuation-in-part of U.S. patent application Ser. No. 13/841,074, filed Mar. 15, 2013; and is a continuation-in-part of U.S. patent application Ser. No. 13/840,563, filed Mar. 15, 2013; and is a continuation-in-part of U.S. patent application Ser. No. 13/938,877, filed Jul. 10, 2013, all owned by the assignee of the present application, and the disclosures of which are incorporated by reference herein. This patent application also incorporates by reference U.S. patent application Ser. No. 14/101,086; filed Dec. 9, 2013 (now U.S. Pat. No. 9,690,029); U.S. patent application Ser. No. 14/101,099, filed Dec. 9, 2013 (now U.S. Pat. No. 9,411,086); U.S. patent application Ser. No. 14/101,132, filed Dec. 9, 2013 (now U.S. Pat. No. 9,442,223); U.S. patent application Ser. No. 14/201,147, filed Dec. 9, 2013 (now U.S. Pat. No. 9,869,432); and U.S. patent application Ser. No. 14/101,051, filed Dec. 9, 2013 (now U.S. Pat. No. 9,366,396).

FIELD OF THE INVENTION

The present inventive subject matter relates to luminaires using optical waveguides, and more particularly to luminaires using low-profile optical waveguides for general lighting.

BACKGROUND OF THE INVENTION

An optical waveguide mixes and directs light emitted by one or more light sources, such as one or more light emitting diodes (LEDs). A typical optical waveguide includes three main components: one or more coupling elements, one or more distribution elements, and one or more extraction elements. The coupling component(s) direct light into the distribution element(s), and condition the light to interact with the subsequent components. The one or more distribution elements control how light flows through the waveguide and is dependent on the waveguide geometry and material. The extraction element(s) determine how light is removed by controlling where and in what direction the light exits the waveguide.

When designing a coupling optic, the primary considerations are: maximizing the efficiency of light transfer from the source into the waveguide; controlling the location of light injected into the waveguide; and controlling the angular distribution of the light in the coupling optic. One way of controlling the spatial and angular spread of injected light is by fitting each source with a dedicated lens. These lenses can be disposed with an air gap between the lens and the coupling optic, or may be manufactured from the same piece of material that defines the waveguide's distribution element(s). Discrete coupling optics allow numerous advantages such as higher efficiency coupling, controlled overlap of light flux from the sources, and angular control of how the injected light interacts with the remaining elements of the waveguide. Discrete coupling optics use refraction, total internal reflection (TIR), and surface or volume scattering to control the distribution of light injected into the waveguide.

After light has been coupled into the waveguide, it must be guided and conditioned to the locations of extraction. The simplest example is a fiber-optic cable, which is designed to transport light from one end of the cable to another with minimal loss in between. To achieve this, fiber optic cables are only gradually curved and sharp bends in the waveguide are avoided. In accordance with well-known principles of total internal reflectance light traveling through a waveguide is reflected back into the waveguide from an outer surface thereof, provided that the incident light does not exceed a critical angle with respect to the surface.

In order for an extraction element to remove light from the waveguide, the light must first contact the feature comprising the element. By appropriately shaping the waveguide surfaces, one can control the flow of light across the extraction feature(s). Specifically, selecting the spacing, shape, and other characteristic(s) of the extraction features affects the appearance of the waveguide, its resulting distribution, and efficiency.

Hulse U.S. Pat. No. 5,812,714 discloses a waveguide bend element configured to change a direction of travel of light from a first direction to a second direction. The waveguide bend element includes a collector element that collects light emitted from a light source and directs the light into an input face of the waveguide bend element. Light entering the bend element is reflected internally along an outer surface and exits the element at an output face. The outer surface comprises beveled angular surfaces or a curved surface oriented such that most of the light entering the bend element is internally reflected until the light reaches the output face Parker et al. U.S. Pat. No. 5,613,751 discloses a light emitting panel assembly that comprises a transparent light emitting panel having a light input surface, a light transition area, and one or more light sources. Light sources are preferably embedded or bonded in the light transition area to eliminate any air gaps, thus reducing light loss and maximizing the emitted light. The light transition area may include reflective and/or refractive surfaces around and behind each light source to reflect and/or refract and focus the light more efficiently through the light transition area into the light input surface of the light-emitting panel. A pattern of light extracting deformities, or any change in the shape or geometry of the panel surface, and/or coating that causes a portion of the light to be emitted, may be provided on one or both sides of the panel members. A variable pattern of deformities may break up the light rays such that the internal angle of reflection of a portion of the light rays will be great enough to cause the light rays either to be emitted out of the panel or reflected back through the panel and emitted out of the other side.

Shipman, U.S. Pat. No. 3,532,871 discloses a combination running light reflector having two light sources, each of which, when illuminated, develops light that is directed onto a polished surface of a projection. The light is reflected onto a cone-shaped reflector. The light is transversely reflected into a main body and impinges on prisms that direct the light out of the main body.

Simon U.S. Pat. No. 5,897,201 discloses various embodiments of architectural lighting that is distributed from contained radially collimated light. A quasi-point source develops light that is collimated in a radially outward direction and exit means of distribution optics direct the collimated light out of the optics.

Kelly et al. U.S. Pat. No. 8,430,548 discloses light fixtures that use a variety of light sources, such as an incandescent bulb, a fluorescent tube and multiple LEDs. A volumetric diffuser controls the spatial luminance uniformity and angular spread of light from the light fixture. The volumetric diffuser includes one or more regions of volumetric light scattering particles. The volumetric diffuser may be used in conjunction with a waveguide to extract light.

Dau et al U.S. Pat. No. 8,506,112 discloses illumination devices having multiple light emitting elements, such as LEDs disposed in a row. A collimating optical element receives light developed by the LEDs and a light guide directs the collimated light from the optical element to an optical extractor, which extracts the light.

A.L.P. Lighting Components, Inc. of Niles, Ill., manufactures a waveguide having a wedge shape with a thick end, a narrow end, and two main faces therebetween. Pyramid-shaped extraction features are formed on both main faces. The wedge waveguide is used as an exit sign such that the thick end of the sign is positioned adjacent a ceiling and the narrow end extends downwardly. Light enters the waveguide at the thick end and is directed down and away from the waveguide by the pyramid-shaped extraction features.

Low-profile LED-based luminaires have recently been developed (e.g., General Electric's ET series panel troffers) that utilize a string of LED components directed into the edge of a waveguiding element (an 'edge-lit' approach). However, such luminaires typically suffer from low efficiency due to losses inherent in coupling light emitted from a predominantly Lambertian emitting source such as a LED component into the narrow edge of a waveguide plane.

BRIEF SUMMARY OF THE INVENTION

Disclosed is a luminaire having a waveguide suspended distal to a mounting element, wherein the waveguide has a first surface proximal to the mounting element, a second surface distal to the mounting element, and an edge between the first surface and the second surface. At least one cavity extends into the waveguide from the first surface to the second surface. An LED component is associated with the waveguide so as to emit light into the at least one cavity.

Also disclosed is a LED support structure for use in a cavity in a waveguide. The LED support structure includes a first surface on which a plurality of LED devices is mounted. An elongate reflective member is mounted to the first surface between the plurality of LED devices and extends away from the first surface, and a reflective element is attached to an end of the elongate reflective member opposite the first surface.

Disclosed too is a second LED support structure for use in a cavity in a waveguide. The second LED support structure includes an upper cap assembly having a base member. An LED mounting member extends from the base member and at least one LED is mounted on an end of the mounting member distal to the base member.

Additionally disclosed is a luminaire having a waveguide suspended distal to a mounting element. The waveguide has a first surface proximal to the mounting element, a second surface distal to the mounting element, and an edge between the first and the second surfaces. At least one cavity extends into the waveguide from the first surface to the second surface. At least one LED component is associated with a first bar assembly and is coupled to the first surface of the waveguide so as to emit light into the cavity.

DETAILED DESCRIPTION OF THE INVENTION

Figure 1:
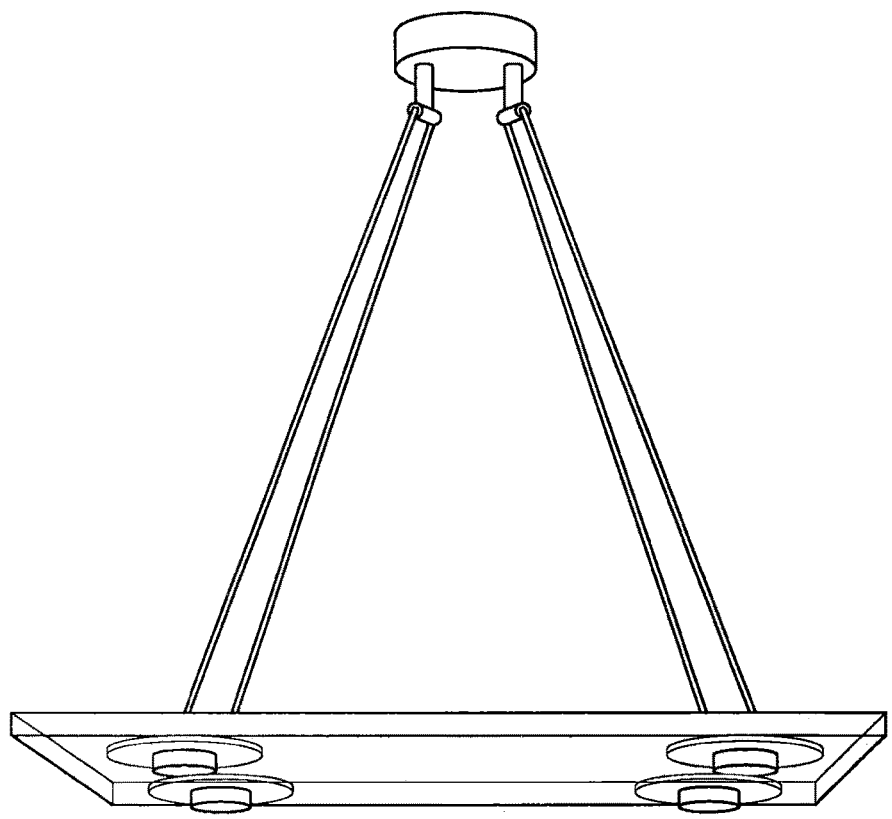
FIG. 1 is a perspective showing a luminaire of the prior art.

The devices described herein utilize a "back-lit" approach in which one or more LED element(s) are located at least partially within one or more bores each in the form of a hole or depression in a waveguide body. In the embodiments shown in the figures, the coupling cavity extends fully through the waveguide body, although the coupling cavity may extend only partially through the waveguide body. A plug member disposed at least partially in the coupling cavity diverts light into the waveguide body. Light extraction features may be disposed in or on one or more surfaces of the waveguide body. A diffuser may be disposed adjacent the waveguide body proximate the plug member(s). In such an arrangement, light emitted by the LED element(s) is efficiently coupled into the waveguide body with a minimum number of bounces off of potentially absorbing surfaces, thus yielding higher overall system efficiency. This arrangement also offers additional potential benefits in that multiple LED elements may be placed apart at greater distances, thereby reducing the need for costly and bulky heat sinking elements. Further, this approach is scalable in that the distance that light must travel through the waveguide body may be effectively constant as the luminaire size increases.

In the back-lit approach described in the immediately preceding paragraph, it is desirable that the proper amount of light is transmitted through each plug such that the local region on the diffuser aligned with the plug member shows neither a bright nor a dark spot, nor a spot with a color that differs noticeably from the surrounding regions. Because the volume of the plug member is generally small, it is necessary to provide the plug with a high degree of opacity, which can be achieved by incorporating highly scattering particles that are typically small in diameter in the material of the plug member. However, small particle diameter typically leads to preferential scattering of short wavelength (blue) light. As a result, the light transmitted through the plug member can have a noticeable yellowish tint, which is typically undesirable.

Further, there exist practical limits on the amount of scattering material that may be incorporated into the plug member. As a result, it may not be possible to achieve sufficient opacity without high absorption using scattering particles that are incorporated into the plug member material. Finally, in regions where the plug member is in contact with the sidewall of the coupling cavity, the index of refraction difference interface at the surface of the cavity may be interrupted, thereby allowing light to transmit from the plug member into the waveguide but not subject to refraction necessary to ensure total TIR within the waveguide.

Still further, a number of LEDs of the same color together comprising an LED element may be disposed in one or more of the coupling cavities. Alternatively, a number of LEDs not all of the same color and together comprising a multi-color LED element may be used in one or more of the coupling cavities of the luminaire in order to achieve a desired lighting effect, such as a particular color temperature. In the former case, a non-uniform intensity of light may be produced. In the latter case, a multi-color LED element may be subject to non-uniform color distribution at high angles, leading to non-uniformity in the color and intensity of output luminance. The non-uniform color distribution also may result from a multi-color LED element having different color LEDs with varying heights. For example, a multi-color LED element may include one or more red LEDs surrounded by a plurality of blue-shifted yellow LEDs. Each red LED has a height that is less than a height of the surrounding blue-shifted yellow LEDs. The light emitted from the red LED, therefore, is obstructed at least in part by the blue-shifted yellow LED, such that the light emanating from the LED element is not uniform. In addition to height differences, differences in the nature of the red and blue-shifted yellow LEDs affect the way the light is emitted from the respective LED.

According to an aspect of the present invention, the coupling cavities may have any of a number geometries defined by surfaces that promote redirection of the light rays (e.g., through refraction) to better mix the light rays developed by the LEDs. Other design features are disclosed herein according to other aspects that promote light mixing and/or color and/or light intensity uniformity. Thus, for example, some embodiments comprehend the use of a thin reflective layer such as a metal layer, on a portion of each plug member wherein the layer is of appropriate thickness to allow sufficient light to transmit without substantial shift in color.

Other embodiments related to the fabrication and surface smoothness of the surface(s) defining the cavity or cavities, change in LED position and/or other modifications to the LED(s) or LED element(s), use of internal TIR features inside the waveguide body, and/or use of one or more masking elements to modify luminance over the surface of the luminaire module.

Figure 2:
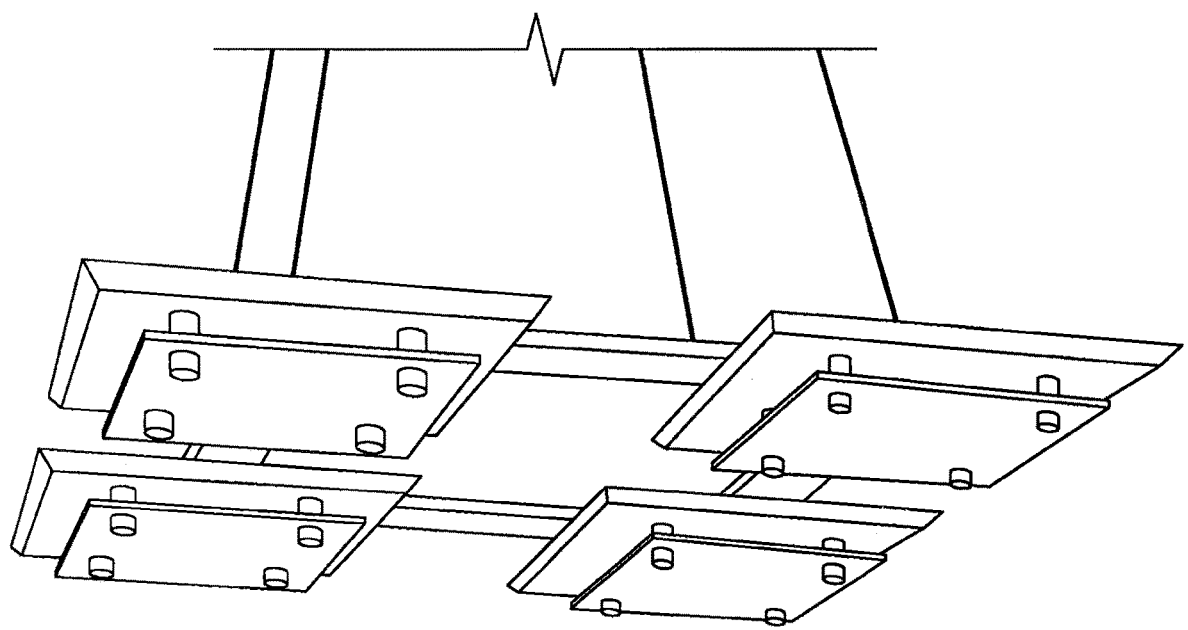
FIG. 2 is a perspective showing a second embodiment of a luminaire in the prior art.
Figure 3:
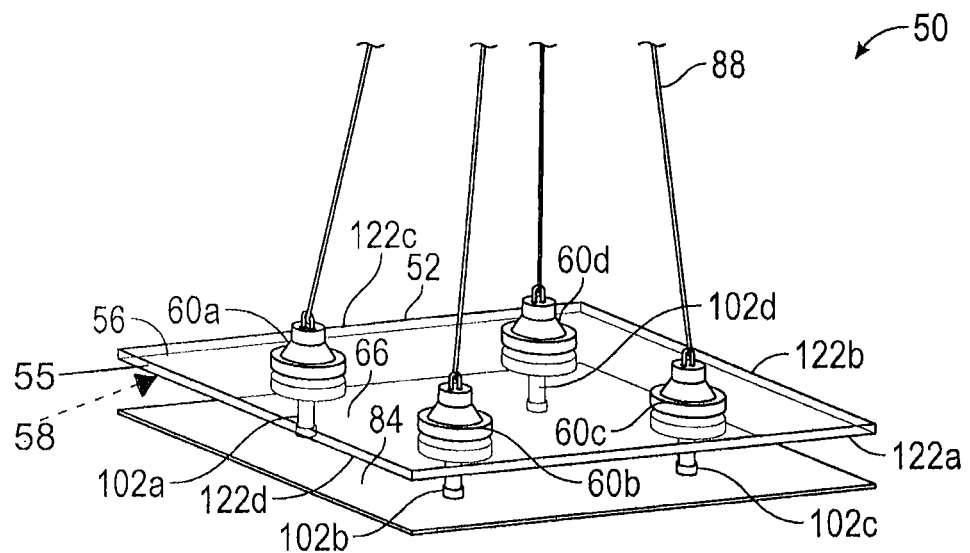
FIG. 3 is a perspective showing an embodiment of a luminaire disclosed in the application.
Figure 4:
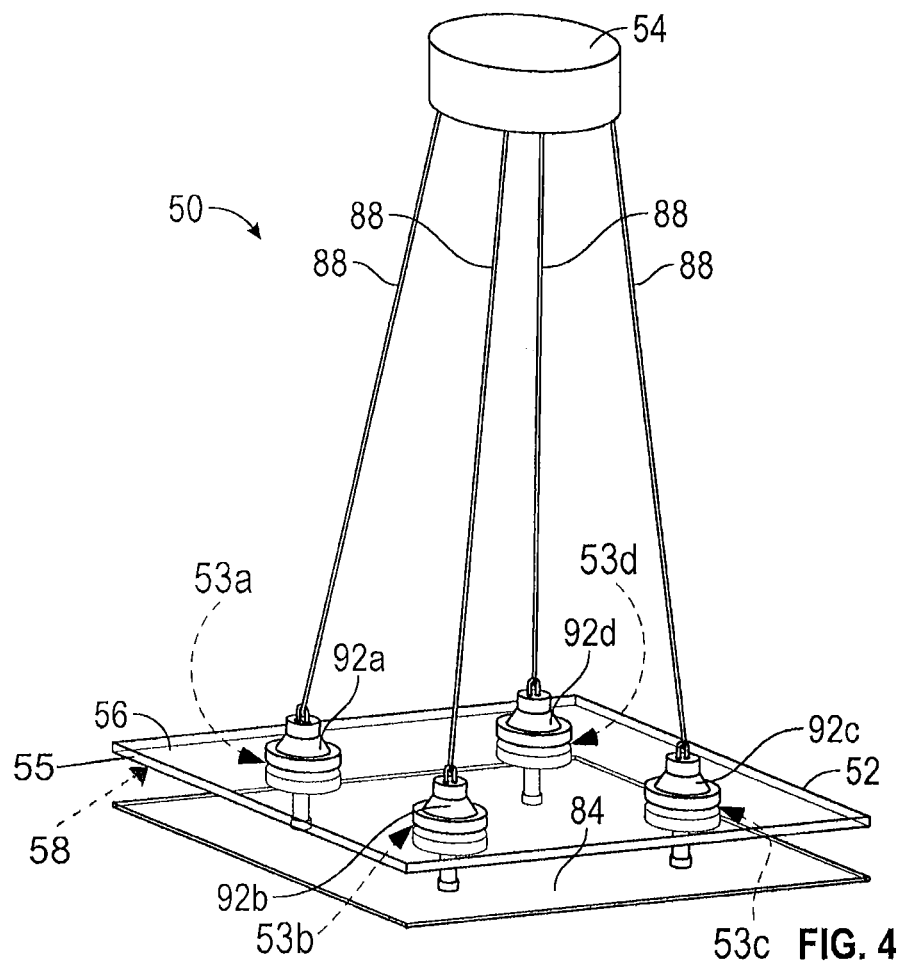
FIG. 4 is a perspective showing another embodiment of a luminaire disclosed in the application.
Figure 5:
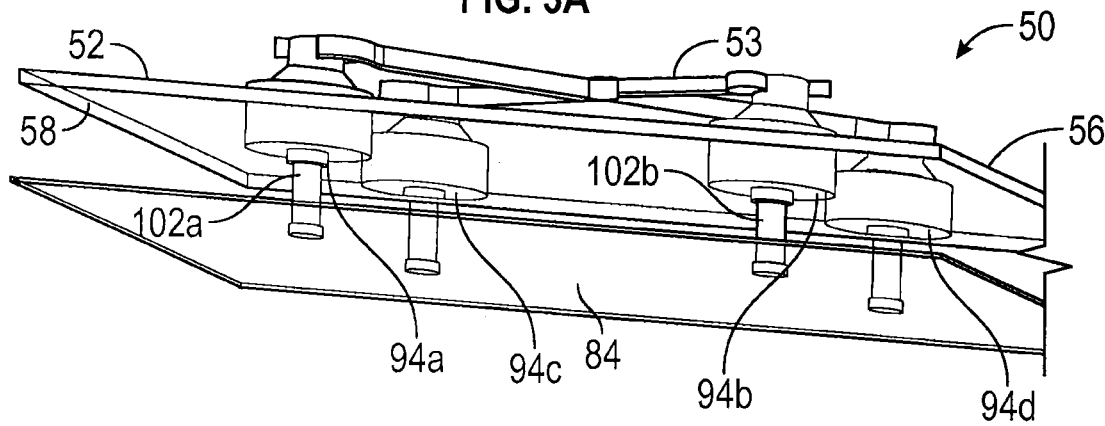
FIG. 5 is a perspective of yet another embodiment of a luminaire disclosed in the application.

FIGS. 1 and 2 show examples of prior art LED-based pendant luminaire products. Each of these products incorporates one or more clear plates 40 that provide a mechanical and aesthetic support structure. The inventive embodiments disclosed herein, on the other hand, utilize one or more waveguides that spread out or distribute the light from one or more LED elements, thereby reducing glare. This eliminates the need for frames, and large backside reflective paper or diffusers, thereby greatly reducing the materials and assembly costs for the luminaire while increasing optical efficiency by minimizing the amount of light incident on reflective materials FIGS. 3-5 show a luminaire 50 that includes a waveguide 52 that may have associated light extraction features (discussed below). The waveguide 52 is suspended distal to a mounting element 54 and has a first surface 56 proximal to the mounting element 54, a second surface 58 distal to the mounting element 54, and an edge 55 between the first and second surfaces 56, 58. At least one coupling cavity 60, illustrated as comprising four cavities 60a-60d each defined by one or more surfaces 61 extends partially or fully through the waveguide 52 from the first surface 56 to the second surface 58. A light source 62 is associated with the waveguide 52 so as to emit light into the at least one coupling cavity 60. In the illustrated embodiment, the light source 62 is implemented by four or more LED elements 53a-53d extending into the coupling cavities 60a-60d, wherein each LED element 53 may be a single white or other color LED or may comprise multiple LEDs either mounted separately or together on a single substrate or package to form an LED element. In the latter case the LED element may include a phosphor-coated LED either alone or in combination with at least one color LED, such as a green LED, a yellow LED, a red LED, etc. In those cases where a soft white illumination is to be produced, the light source typically includes one or more blue shifted yellow LEDs and one or more red LEDs. Different color temperatures and appearances could be produced using other LED combinations, as is known in the art. In one embodiment, the light source 62 comprises any LED, for example, an MT-G LED element incorporating TrueWhite® LED technology or as disclosed in U.S. patent application Ser. No. 13/649,067, filed Oct. 10, 2012 (now U.S. Pat. No. 9,818,919) entitled "LED Package with Multiple Element Light Source and Encapsulant Having Planar Surfaces" by Lowes et al., the disclosure of which is hereby incorporated by reference herein, both as developed by Cree, Inc., the assignee of the present application. In any of the embodiments disclosed herein the LED(s) have a particular emission distribution, as necessary or desirable. For example, a side emitting LED disclosed in U.S. Pat. No. 8,541,795, the disclosure of which is incorporated by reference herein, may be utilized inside the waveguide body. More generally, any lambertian, symmetric, wide angle, preferential-sided, or asymmetric beam pattern LED(s) may be used as the light source. Still further, any of the LED arrangements and optical elements disclosed in U.S. patent application Ser. No. 14/101,147, entitled "Luminaires Using Waveguide Bodies and Optical Elements" by Bernd Keller et al., filed Dec. 9, 2013 (now U.S. Pat. No. 9,869,432), incorporated by reference herein, may be used.

The light source 62 is operated by control circuitry (not shown) in the form of a driver circuit that receives AC or DC power. The control circuitry may be disposed on the luminaire 50 or may be located remotely (such as in the mounting element 54 and/or an electrical junction box to which the mounting element 54 is secured), or a portion of the control circuitry may be disposed on the luminaire 50 and the remainder of the control circuitry may be remotely located. In any event, the control circuitry is designed to operate the light source with AC or DC power in a desired fashion to produce light of a desired intensity and appearance. If necessary or desirable, a heat exchanger (not shown in FIGS. 3-5) is arranged to dissipate heat and eliminate thermal crosstalk between the LEDs and the control circuitry. Preferably, the light source 62 develops light appropriate for general illumination purposes including light similar or identical to that provided by an incandescent, halogen, or other lamp that may be incorporated in a down light, a light that produces a wall washing effect, a task light, a troffer, or the like.

The waveguide 52 has a main body of material 66 that, in the illustrated embodiment, has a width and length substantially greater than an overall thickness thereof and is substantially or completely rectangular or any other shape in a dimension transverse to the width and thickness. In an embodiment, the waveguide may have a thickness of about 500 microns to about 10 mm. In a more particular version of this embodiment, the waveguide may have a thickness of about 3 mm to about 6 mm. The waveguide body 66 may be made of any suitable optical grade material including one or more of acrylic, air, molded silicone, polycarbonate, glass, and/or cyclic olefin copolymers, and combinations thereof, particularly (although not necessarily) in a layered arrangement to achieve a desired effect and/or appearance.

One or more reflective substrates 68, 69, such as reflective paper layers of limited extent in width and length, and which may be, for example, of 97 brightness are disposed on the first and second surfaces 56, 58, respectively, surrounding the coupling cavity 60 proximal thereto. If desired, a reflective substrate may be disposed on only one of the surfaces 56, 58 or the reflective substrates may be omitted. Still further, one or both of the reflective substrates may be specular. In all of the illustrated embodiments, the surface(s) 61 defining the cavity 60 is (are) preferably (although not necessarily) normal to the first and second sides of the waveguide 52. In some or all of the embodiments disclosed herein, the surface(s) 61 (and, optionally, the surfaces defining alternate cavities described herein) is (are) polished and optically smooth. Also preferably, each LED element 53 extends into an associated cavity 60 from the first surface 56 thereof.

Figure 7:
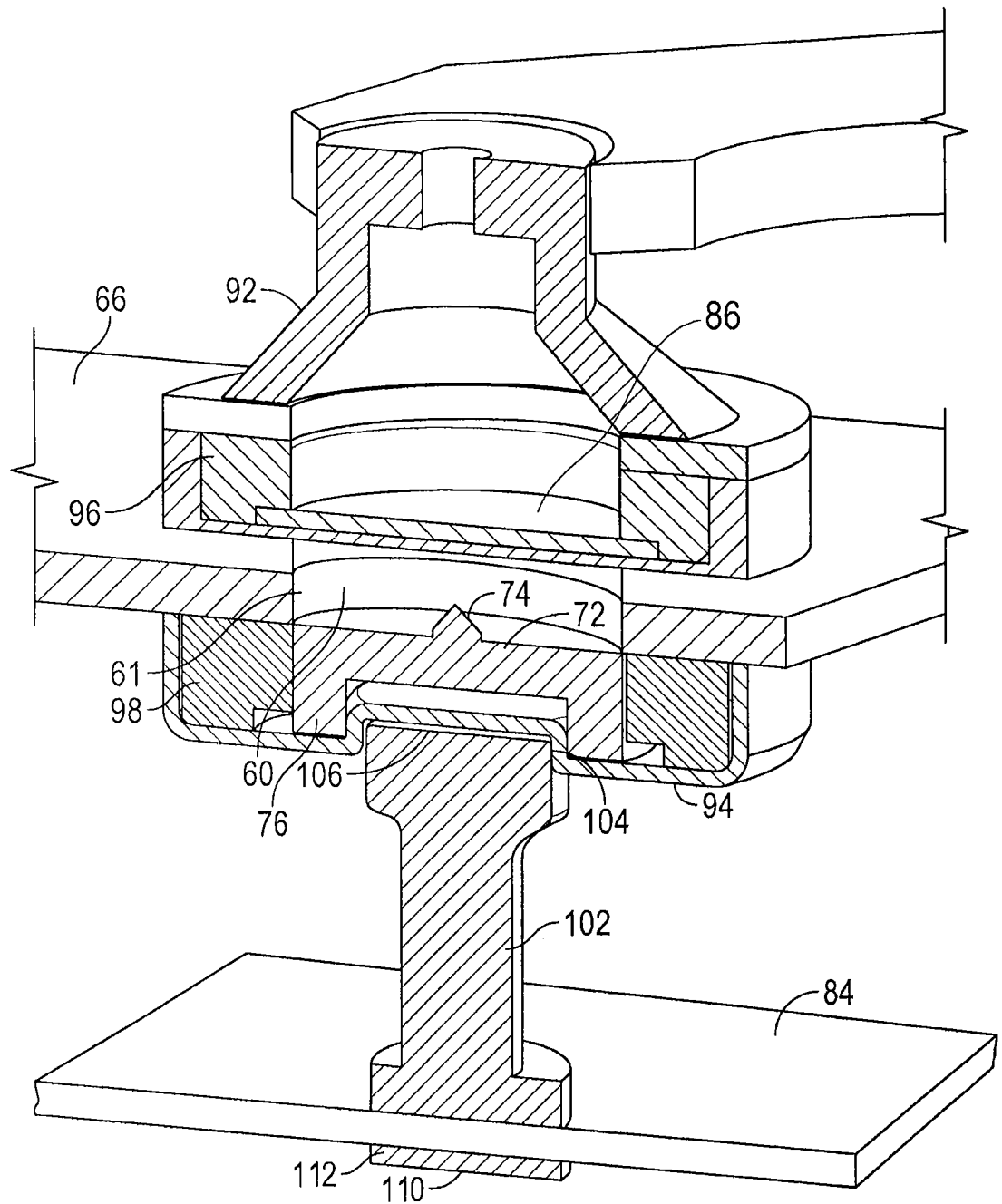
FIG. 7 is an isometric cross sectional view taken generally along the lines 7-7 of FIG. 4.

Still further in the illustrated embodiment as seen in FIG. 7, a light diverter of any suitable shape and design, such as a conical plug member 72, extends into each cavity 60 from the second surface 58. The plug members 72 are preferably (although not necessarily) identical to one another, as are the remaining components associated with each cavity 60, and hence, FIG. 7 illustrates only one of the cavities 60 and associated components in detail. Specifically, as seen in FIG. 7, the surface 61 is preferably circular cylindrical in shape and the conical plug member 72 includes a first portion 74 that extends into the cavity 60 and is circular in cross section. A second portion 76 of the plug member 72 is secured by any suitable means, such as an adhesive or magnets as described in greater detail hereinafter, to the surface 58. Still further, if desired, the conical plug member 72 may be integral with the waveguide body 66 rather than being separate therefrom. Further, the light source 62 may be integral with or encased within the waveguide body 66, if desired. In the illustrated embodiment, the second portion 76 forms an angle relative to the portion 74 of at least about 0 degrees, and more preferably between about 15 degrees and about 60 degrees, and most preferably about 20 degrees. In the illustrated embodiment, the plug member 72 may be made of white polycarbonate or any other suitable transparent or translucent material, such as acrylic, molded silicone, polytetrafluoroethylene (PTFE), Delrin® acetyl resin, or any other suitable material. The material of the plug member 72 may be the same as or different than the material of the waveguide body 66.

In an embodiment, the plug member 72 may be removable from the waveguide 52. In yet another embodiment, a reflective coating is applied to at least the second portion 76 of the plug member 72, for example, as disclosed in U.S. patent application Ser. No. 14/101,086, entitled "Optical Waveguides and Luminaires Incorporating Same" by Bernd Keller et al., filed Dec. 9, 2013 (now U.S. Pat. No. 9,690,029), incorporated by reference herein. Specifically, in the first embodiment, and, optionally, in other embodiments disclosed herein, the second portion 76 of the plug member 72 is coated with a reflecting material using any suitable application methodology, such as a vapor deposition process. Preferably, a thin reflective layer, such as a metal layer of particles, of appropriate layer thickness is uniformly disposed on the conical portion 76 to allow sufficient light to transmit through the plug member 72 so that development of a visually observable spot (either too bright or too dark or color shifted with respect to surrounding regions) is minimized at an outer surface of the luminaire adjacent the plug member 72. In the preferred embodiment the metal layer comprises aluminum or silver. In the case of silver, the reflective layer preferably has a thickness of no greater than about 100 nm, and more preferably has a thickness between about 10 nm and about 70 nm, and most preferably has a thickness of about 50 nm. In the case of aluminum, the reflective layer preferably has a thickness of no greater than about 100 nm, and more preferably has a thickness between about 10 nm and about 50 nm, and most preferably has a thickness of about 30 nm.

Figure 7A:
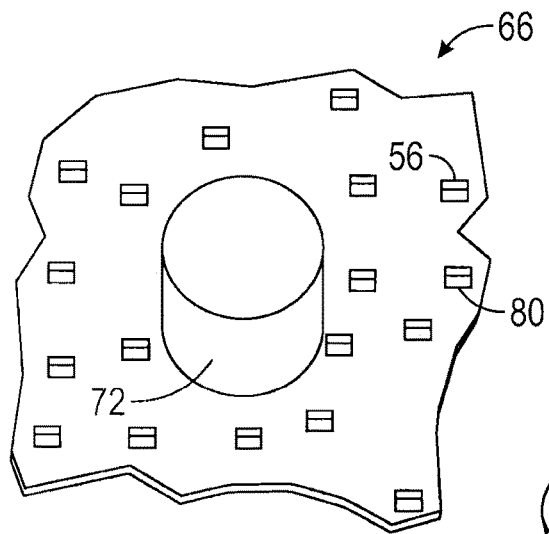
FIG. 7A is a fragmentary, enlarged, isometric view of a portion of the waveguide body of any of the embodiments disclosed herein illustrating light extraction features.

In all of the embodiments disclosed herein and as seen in FIG. 7A, one or more pluralities of light extraction features or elements 80 may be associated with the waveguide body 66. For example one or more light extraction features 80 may be disposed in one or both sides or faces of the waveguide body 66. Each light extraction feature 80 comprises a wedge-shaped facet or other planar or non-planar feature that is formed by any suitable process, such as embossing, cold rolling, or the like, as disclosed in U.S. patent application Ser. No. 13/842,521, filed Mar. 15, 2013 (now U.S. Pat. No. 9,519,095). Preferably, in all of the embodiments disclosed herein the extraction features 80 are disposed in an array such that the extraction features 80 are disposed at a first density proximate the coupling cavity 60 and gradually increase in density with distance from the light source 62, as seen in U.S. patent application Ser. No. 13/842,521, filed Mar. 15, 2013 (now U.S. Pat. No. 9,519, 095). In any of the embodiments disclosed herein, the extraction features 80 may be similar or identical to one another in shape, size, and/or pitch (i.e., spacing), or may be different from one another in any one or more of these parameters, as desired. The features may comprise indents, depressions, or holes extending into the waveguide, or bumps or facets or steps that rise above the surface of the waveguide, or a combination of both bumps and depressions. Features of the same size may be used, with the density of features increasing with distance from the source, or the density of features may be constant, with the size of the feature increasing with distance from the source and coupling cavity 60. For example, where the density of the extraction features is constant with the spacing between features of about 500 microns, and each extraction feature comprises a hemisphere, the diameter of the hemisphere may be no greater than about 1 mm, more preferably no greater than about 750 microns, and most preferably no greater than about 100 microns. Where each extraction feature comprises a shape other than a hemisphere, preferably the greatest dimension (i.e., the overall dimension) of each feature does not exceed about 1 mm, and more preferably does not exceed about 750 microns, and most preferably does not exceed about 100 microns. Also, the waveguide body 66 may have a uniform or non-uniform thickness. Irrespective of whether the thickness of the waveguide body 66 is uniform or non-uniform, a ratio of extraction feature depth to waveguide body thickness is preferably between about 1:10,000 and about 1:2, with ratios between about 1:10,000 and about 1:10 being more preferred, and ratios between about 1:1000 and about 1:5 being most preferred.

It should also be noted that the extraction features may be of differing size, shape, and/or spacing over the surface(s) of the waveguide body 66 so that an asymmetric emitted light distribution is obtained. For example, as seen in U.S. patent application Ser. No. 14/101,086, entitled "Optical Waveguides and Luminaires Incorporating Same" by Bernd Keller et al., filed Dec. 9, 2013 (now U.S. Pat. No. 9,690, 029), a relatively large number of extraction features may be disposed to the left of the coupling cavity 60 and a relatively small number of extraction features 80 are disposed to the right of the coupling cavity 60. As should be evident, more light is extracted from the left side of the waveguide body 66 and relatively less light is extracted from the right side of the waveguide body 66.

Figure 3A:
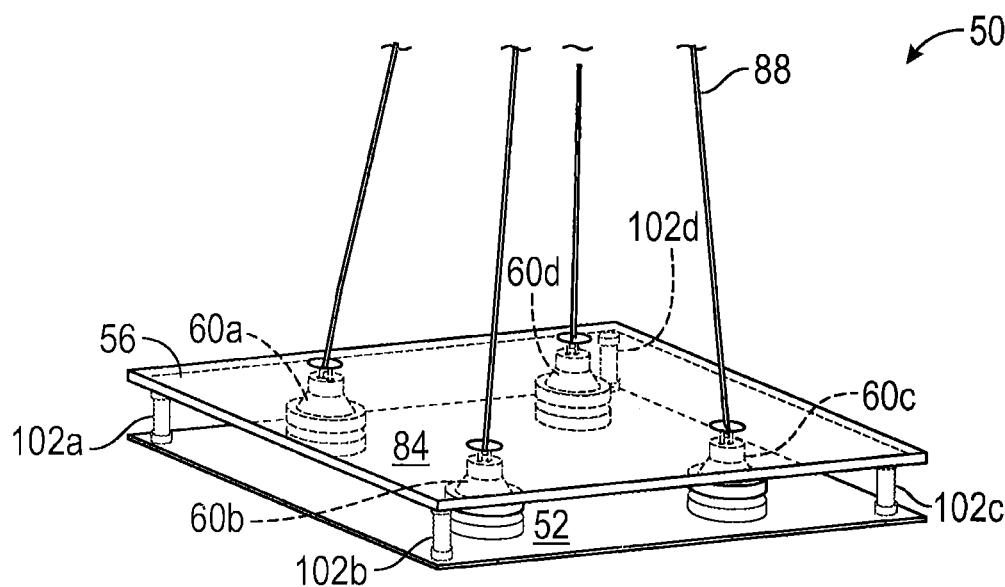
FIG. 3A is a perspective showing a second embodiment of a luminaire disclosed in the application.

In an embodiment, a second optical element 84 may be displaced from the second surface 58 of the waveguide 52 opposite the waveguide, as shown in FIGS. 5 and 7. The waveguide 52 and second optical element 84 may be held in place in a number of ways including with an adhesive, a mechanical element, such as one or more fasteners (e.g., screws or bolts), or magnets, as noted in greater detail hereinafter. In such an embodiment, the second optical element 84 acts as a diffuser. In another embodiment, the second optical element 84 may be displaced from the first surface 56 of the waveguide 52, as shown in FIG. 3A. In this particular embodiment, the second optical element 84 acts as a reflector.

In an embodiment, the LED or LED element or element is mounted on a printed circuit board 86. If desired, the reflective substrate 69 may be disposed on the printed circuit board 86 facing the second surface 58.

In any of the embodiments disclosed herein the second portion 76 of the light diverter 70 may be non-conical and may have a substantially flat shape, a segmented shape, an inclined shape to direct light out a particular side of the waveguide body, etc.

In alternate embodiments, the plug member 72 has a first portion of any other suitable noncircular shape, including a symmetric or asymmetric shape, as desired, and a second portion preferably (although not necessarily) of conical shape as noted above. The coupling cavity 60 may also (although it need not) have a noncircular shape or the shape may be circular where the first portion 74 is disposed and secured (in which case the first portion 74 may be circular cylindrical) and the shape of the coupling cavity 60 may be noncircular in other portions (i.e., at locations remote from the first portion 74). Specifically, the coupling cavity 60 may be of any shape including, for example, those disclosed in U.S. patent application Ser. No. 14/101,086, entitled "Optical Waveguides and Luminaires Incorporating Same" by Bernd Keller et al., filed Dec. 9, 2013 (now U.S. Pat. No. 9,690,029), incorporated by reference herein, to promote mixing of light developed by the light source 62. Light mixing may be further enhanced by incorporating light redirection features and/or LED modifications as disclosed in U.S. patent application Ser. No. 14/101,132, entitled "Waveguide Bodies Including Redirection Features and Methods of Producing Same" by Eric J. Tarsa, filed Dec. 9, 2013 (now U.S. Pat. No. 9,442,243), U.S. patent application Ser. No. 14/101,147 by Bernd Keller et al., filed Dec. 9, 2013 (now U.S. Pat. No. 9,869,432), and U.S. patent application Ser. No. 14/101,051, entitled "Optical Waveguide and Lamp Including Same" by Zongjie Yuan et al., filed Dec. 9, 2013 (now U.S. Pat. No. 9,366,396), all incorporated by reference herein.

In an embodiment, the mounting element 54 of the luminaire 50 is attached to any suitable surface including a sidewall or a ceiling, as shown in FIG. 4. Any suitable structure, such as a plurality of rods or sections of wire rope 88 may extend between and secure first cap assemblies 92*a*-92*d* to the mounting element 52 while second cap assemblies 94*a*-94*d* are positioned adjacent the second surface 58 of the waveguide 52, as shown in FIGS. 3-5 and 7. The first and second cap assemblies 92, 94 are maintained in fixed relation to one another by any suitable means, and the first cap assemblies 92*a*-92*d* enclose the LED elements 53*a*-53*d*, respectively, and the second cap assemblies 94*a*-94*d* enclose the plug members 72. One or both of the cap assemblies 92, 94 may also provide electrical and thermal contact to the LED component, and may also serve as a heat sink.

The first and second cap assemblies 92, 94 may be attached to the waveguide 52. This can be achieved through the use of an adhesive, magnets, or mechanical fasteners such as a screw. As shown in FIGS. 3-5, at least one extender 102a-d may be positioned between the waveguide 52 and the second optical element 84 to hold the second optical element 84 to the waveguide 52. A separator 53 may also be placed between at least two LED components 62 to ensure the proper spacing between LED components 62 and or facilitate assembly of the luminaire, as shown in FIG. 5. As noted in greater detail hereinafter in connection with another embodiment, a reflective element is attached to an edge of the waveguide surrounding the first and second surfaces 92, 94. In a more particular version of this embodiment, the reflective element is a specular coating.

In the embodiment illustrated in FIG. 7 the upper and lower cap assemblies 92, 94 are maintained in fixed relation by magnets 96, 98. Specifically, the magnet 96 is ring-shaped and disposed within and secured by adhesive or any other suitable means (such as magnetic force in the event that the first cap assembly 92 is made of a magnetic material) to the first cap assembly 92. The magnet 96 includes a recess defined by a counterbore 100 to accommodate the circuit board 86. The magnet 98 is also ring-shaped and is secured by adhesive or any other suitable means (such as magnetic force in the event that the second cap assembly 94 is made of a magnetic material) to the second cap assembly 94. Magnetic forces exerted by the magnets 96, 98 trap the waveguide 52 between the first and second cap assemblies 92, 94 and the interferences between the magnets 96, 98, the circuit board, 86, the plug member 72, and the surface(s) 61 keep the first and second cap assemblies 92, 94 from laterally shifting relative to the waveguide 52.

In the illustrated embodiment of FIGS. 3-5 and 7, four extender members 102a-102d are positioned between the waveguide 52 and the diffuser 84 to hold the diffuser 84 to the waveguide 52. As seen in FIG. 7, each second cap assembly 94 includes a central recess 104 that receives a first end 106 and may serve to develop magnetic force to secure the extender member 102 to the second cap assembly 94 in the event the assembly 94 is made of a magnetic material. Otherwise, an adhesive or other fastening means may be used to secure the extender member 102 to the lower cap assembly 94. The extender member 102 further includes a second end 110 having a further magnet 112 disposed therein, and a button 114 with a still further magnet 116 retained therein captures the diffuser 84 in place below the waveguide 52.

If desired, and as shown in FIGS. 5 and 7, one or more separator members 120 may be placed between at least two of the first and/or second cap assemblies 92 and/or 94 to ensure proper spacing between LED components and or facilitate assembly of the luminaire 50. In another embodiment, a fully or partially reflective element or coating is applied to one or more edges 122a-122d of the waveguide 52 to minimize light leakage from such edges. In a more particular version of this embodiment, the reflective element is a specular coating.

Figure 6:
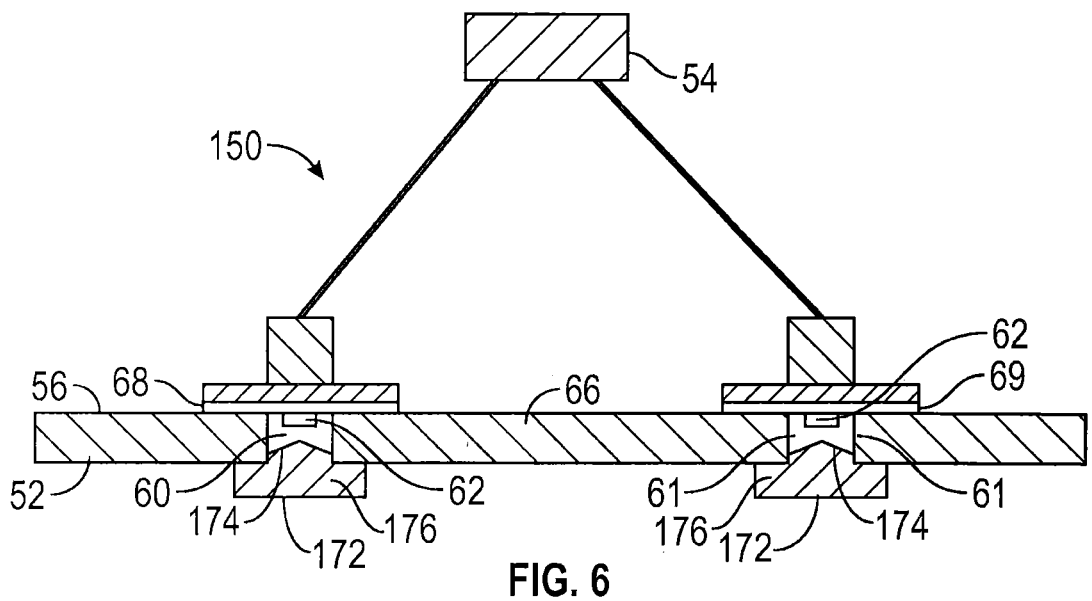
FIG. 6 is a cross-section of a luminaire similar that shown in FIG. 1, with modifications to incorporate a waveguide therein.

FIG. 6 illustrates an embodiment that may utilize any or all of the concepts disclosed in connection with FIGS. 3-5 and 7 discussed above. FIG. 6 illustrates a luminaire 150 comprising a modification to the pendant-style luminaire of FIG. 1, except that the clear plates 40 are replaced by the waveguide 52 of FIGS. 3-5 and 7. In this embodiment, each of the cavities 60a-60d defined by surfaces 61 receives one or more LED elements 53 disposed on a circuit board 86 having a reflective paper layer 69 disposed thereon wherein the LED element(s) 53 and the circuit board 86 are maintained in an assembled relationship by first cap assemblies 92. Plug members 172 have a first portion 174 that extends into the cavities 60. The plug members 172 may have second portions 176 that are of differing shape as compared to the second members of the plug members 72; however, the plug members 72, 172 may otherwise be identical or similar in size, shape, material composition, optical characteristics, and the like.

The first cap assemblies 92 and the plug members 172 may be retained in any suitable fashion relative to one another and relative to the waveguide 52, such as by adhesive, magnetic forces, interference or friction fits, fasteners, or the like. The embodiment of FIG. 6 may be otherwise identical to that shown in FIGS. 3-5 and 7.

Figure 8A:
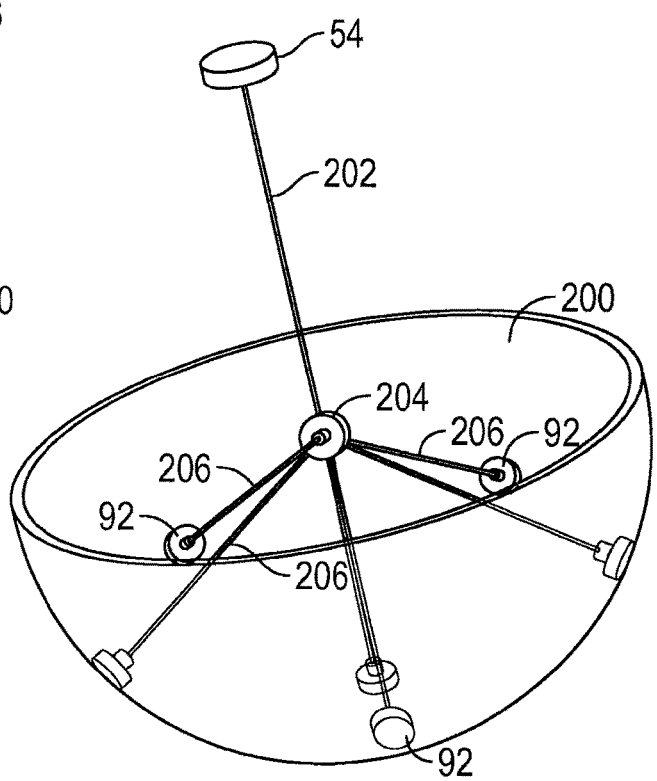
FIG. 8A is an isometric view of an embodiment of further luminaire disclosed in the application.
Figure 8B:
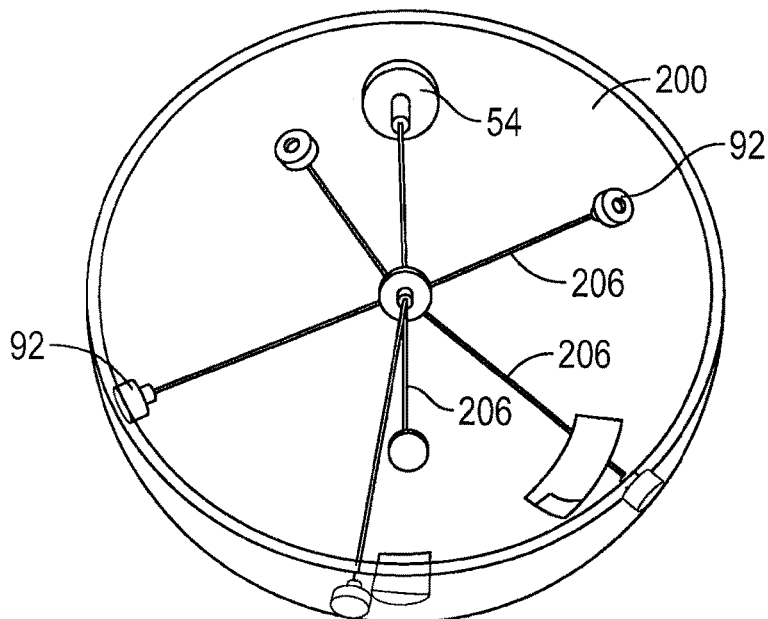
FIG. 8B is a further isometric view of the embodiment of FIG. 8A.

In addition to being a flat surface, the waveguide 52 may, in a different embodiment, have a three-dimensional geometry. One example of a three-dimensional geometry is a hemispherical waveguide 200, as shown in FIGS. 8A and 8B, which is supported by a mounting element 54, a main rod 202 supported by the mounting element 54, a junction member 204 joined to the main rod 202, and auxiliary rods 206 secured to the junction member 204 that extend to cap assemblies 92. The cap assemblies 92 are secured to the waveguide 200 in the fashion shown in FIG. 6 or 7.

Figure 10:
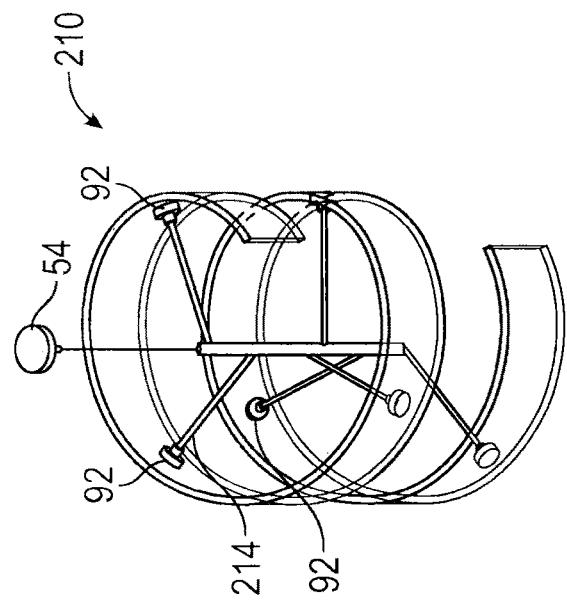
FIG. 10 is an isometric view of the embodiment of FIG. 9.
Figure 12:
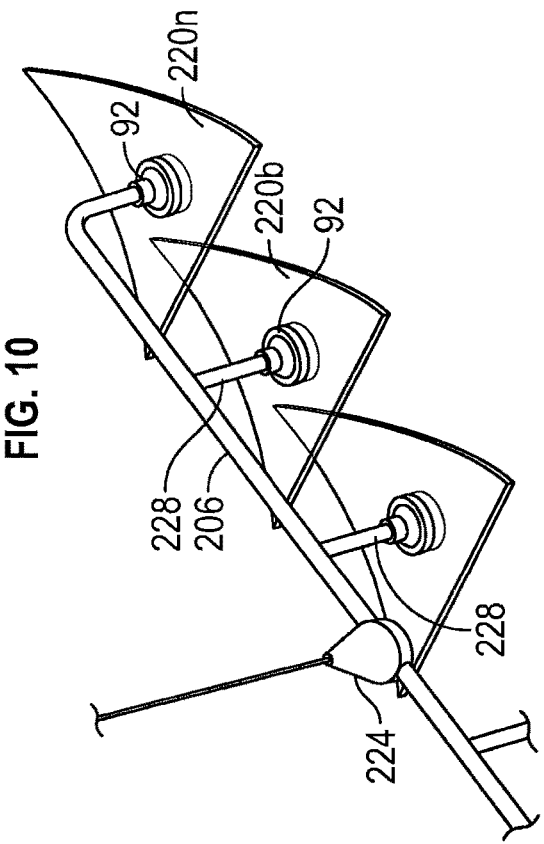
FIG. 12 is an enlarged, fragmentary, isometric view of the embodiment of FIG. 11.
Figure 9:
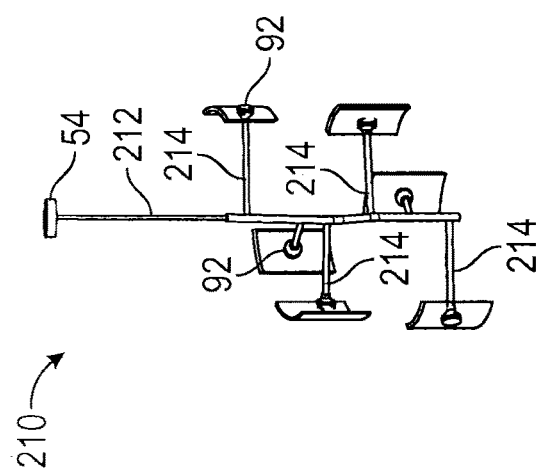
FIG. 9 is a side elevational view of another embodiment of a luminaire disclosed in the application.
Figure 11:
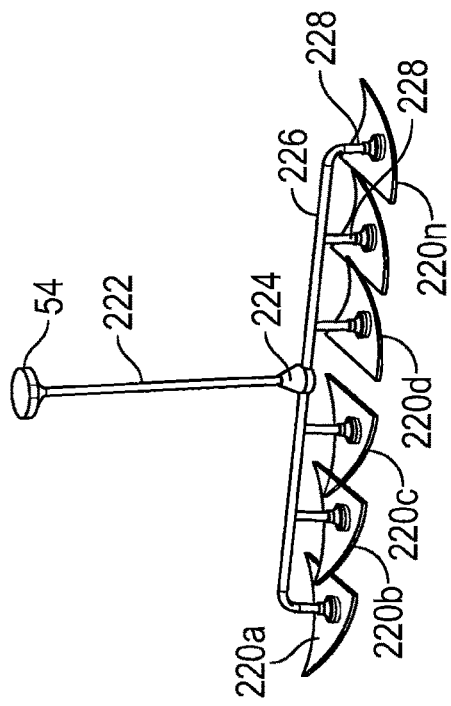
FIG. 11 is an isometric view of still another embodiment of a luminaire disclosed in the application.

In other embodiments, the first and the second surfaces of the waveguide are generally curved surfaces. Examples of such embodiments are shown in FIGS. 9-12. Specifically, as seen in FIGS. 9 and 10, a curved waveguide in the form of a helical waveguide body 210 is supported by a mounting member 54, a central axially extending rod 212 supported by the mounting member 54, transverse rod sections 214 extending radially from and joined to the rod 212, and cap assemblies 92 carried on ends of the rod sections 214. FIGS. 11 and 12 illustrate curved waveguide sections 220a, 220b, . . . 220n each being approximately wedge-shaped and being supported by a mounting member 54, a main rod 222 supported by the mounting member 54, a junction member 224 secured to the main rod 222, a transverse rod 226 carried by the junction member 224, auxiliary rods 228 supported by the transverse rod 226, and cap assemblies 92 carried on ends of the rod 226 and rods 228.

The cap assemblies 92 of FIGS. 8A, 8B, and 9-12 may be similar or identical to the cap assemblies of FIGS. 3-5 and 7 or FIG. 6 in that each preferably encloses one or more LED elements 53 disposed in coupling cavities identical or similar to the coupling cavities 60 described above. Further, plug members 72 or 152 may be disposed in the coupling cavities 60 of the embodiments of FIGS. 8A, 8B, and 9-12 opposite the LED elements 53 to direct light into the waveguides 52. Inasmuch as the waveguides of these embodiments are curved, light may be extracted out of the waveguides in a suitable fashion according to well-known principles of TIR depending upon the degree of curvature without the need for extraction features 80, although the features 80 may be utilized, if desired.

In an embodiment, a masking element may be disposed on the waveguide body. A plurality of LEDs may also be disposed in the coupling cavity. The plurality of LEDs may be all of the same color or they may be comprised of different colors. The coupling cavity may be disposed at an interior portion of the waveguide body, while in another embodiment, the cavity may be disposed at an edge of the waveguide body. In still another embodiment, a reflective cover is disposed adjacent the LED. Such variations are disclosed in U.S. patent application Ser. No. 14/101,086, entitled "Optical Waveguides and Luminaires Incorporating Same" by Bernd Keller et al. (now U.S. Pat. No. 9,690,029), U.S. patent application Ser. No. 14/101,132, entitled "Waveguide Bodies Including Redirection Features and Methods of Producing Same" by Eric J. Tarsa, filed Dec. 9, 2013 (now U.S. Pat. No. 9,442,243), and U.S. patent application Ser. No. 14/101,147, entitled "Luminaires Using Waveguide Bodies and Optical Elements" by Bernd Keller et al., filed Dec. 9, 2013 (now U.S. Pat. No. 9,869,432).

When in operation, in one embodiment, the luminaire develops a total output of at least about 800-10,000 lumens or greater. In a more particular version of the embodiment, the luminaire develops a total output of at least about 3,500 lumens. The luminaire may also develop a color temperature of between about 2,500 degrees Kelvin and about 6,200 degrees Kelvin and have an efficacy of at least about 100 lumens per watt and, more particularly, of at least about 120 lumens per watt.

The luminaire also has a coupling efficiency of at least about 92 percent and, more particularly, of at least about 95 percent. Further, the luminaire has an overall efficiency of at least about 85 percent and, more particularly, of at least about 90 percent. The luminaire also has a color rendition index (CRI) of at least about 80 and, more particularly, of at least about 88. It also has a gamut area index (GAI) of at least about 65.

Figure 13:
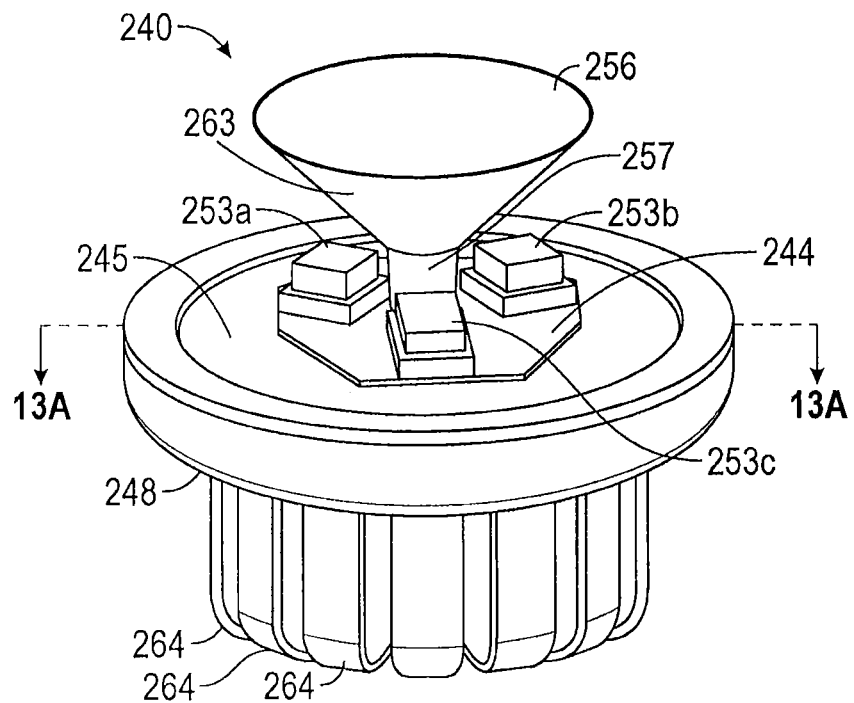
FIG. 13 is an isometric view of an LED support structure disclosed in the application.

With reference to FIGS. 13, 13A, 14 and 15, also disclosed herein is an LED support structure 240 for use in a cavity 241 defined by surfaces 242 of a waveguide 243, wherein the LED support structure 240 includes a printed circuit board 244 disposed on a base plate 245. A reflective coating or member may be disposed on an exposed (i.e., upper as seen in FIG. 13) surface of the printed circuit board 244, if desired. The base plate 245 is secured in a counterbore 246 of a housing 248 in any suitable fashion. A plurality of LED elements 253a, 253b, 253c, each of which may be similar or identical to the LED element 53 is mounted on the printed circuit board 244. A reflective member 256 includes an elongate reflective member 257 integral with or secured to a base rod 258 that is secured in any known fashion in a cavity 260 extending through the base plate 245. The central portion 257 is preferably centrally disposed between the plurality of LED elements 253a-253c. A further reflective member 261 is attached to or integral with an end 262 of the central portion 257 opposite the base rod 258. In the illustrated embodiment, the further reflective member 261 comprises a conically-shaped or other shape element having an outer surface 263 that may be at least partially light reflective and, optionally, partially light transmissive. In the latter case, the member 261 may include light scattering particles and/or translucent portions with the goal of efficiently coupling light into the waveguide 243 with a minimal number of bounces of light within the waveguide cavity 241 and/or to obtain a specific luminance or illuminance pattern. If desired, one or more sensors and/or control elements, such as motion of illumination sensors, may be disposed in the further reflective member 261.

Preferably, although not necessarily, the housing 248 includes a plurality of heat transfer elements or appendages 264 that act as a heat sink. In a more particular version of the embodiment, the housing 248 is made of a thermally conductive material and the heat transfer elements are fins 264.

Figure 14:
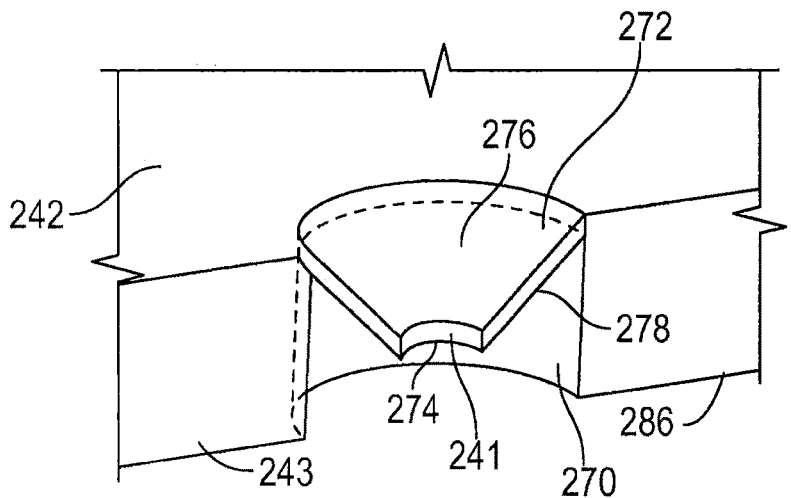
FIG. 14 is an isometric sectional view of a waveguide cavity used in a luminaire disclosed in the application.

With reference to FIG. 14, the surfaces 242 defining the cavity 241 define a circular cylindrical (or other shape) cavity section 270 and a conical cavity section 272 terminating at an opening 274. If desired, on or both of upper and lower tapered surfaces 276, 278 of the conical section 272 may be coated with a reflective material, such as white or silver material, and such material may be fully or partially optically transmissive.

Figure 13A:
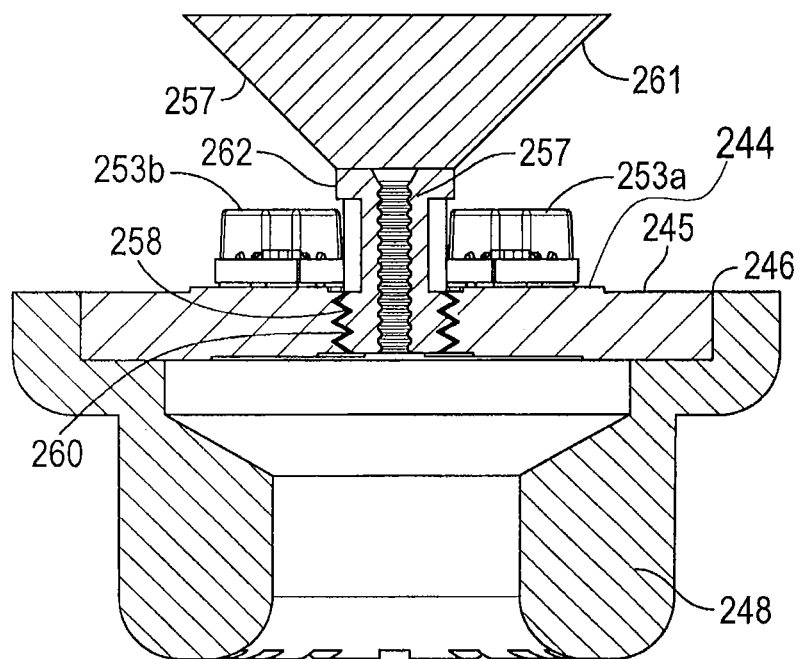
FIG. 13A is cross-sectional view of the LED support structure of FIG. 13.
Figure 15:
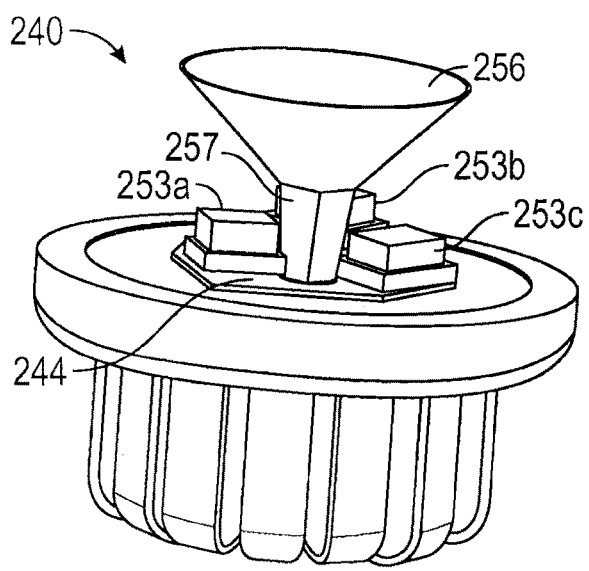
FIG. 15 is an isometric view of another LED support structure disclosed in the application.
Figure 16:
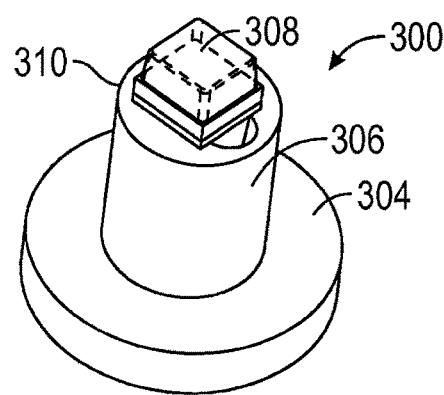
FIG. 16 is a perspective of a still further LED support structure disclosed in the application.

The LED support structure 240 without the reflective member 256 is disposed adjacent a surface 286 of the waveguide 241 so that the LED elements 253 are disposed in the cavity section 270 below the conical cavity section 272. The reflective member 256 extends into the cavity 241 extending through the opening 274 and the base rod 258 is inserted into and retained within the bore 260 of the base plate 245. As seen in FIG. 13A, the various components are dimensioned such that the waveguide 241 is captured firmly between the further reflective member 261 and the housing 248. In addition, the upper tapered surface 276 closely, if not completely, conforms to the outer surface of the conically-shaped further reflective member 261. Also in the illustrated embodiment as seen in FIG. 15, the elongate reflective member 257 may have a triangular cross-sectional shape defined by three face surfaces 290a, 290b, and 290c that may be formed with a reflective material, such as a specular or white coating material. Alternatively, the central portion 257 may have different shape (such as circular cylindrical) and/or may be partially or fully optically transmissive with or without scattering particles disposed thereon and/or may exhibit an optical effect, such as lambertian or the like.

In operation, light developed by each LED element 253 directly enters the waveguide 243 or reflects off one or more of the surfaces 272, 276, 278, and/or 290 and eventually enters the waveguide 243. The surfaces 290a-290c enhance uniformity of light transmitted through the waveguide and minimize the amount of light emitted by one LED element 253 from reaching other LED elements 253, where such light might be undesirably absorbed. The surfaces 290 also enhance color mixing for example, in a situation where a non-uniform color emission occurs from an LED element 253.

Any of the features disclosed in FIGS. 13, 13A, 14 and/or 15 may be used in combination with any of the features disclosed in other Figures of this application as described herein.

Next, referring to FIG. 16-19, a further LED support structure 300 may be used in any of the waveguide cavities disclosed herein. This further LED support structure 300 includes a first cap assembly 302 and includes a base member 304 and an LED mounting member 306 that extends away from the base member 304. At least one LED element 308 that may be similar or identical to the LED elements disclosed herein is mounted on an end 310 of the mounting member 306 distal to the base member 304.

Figure 17:
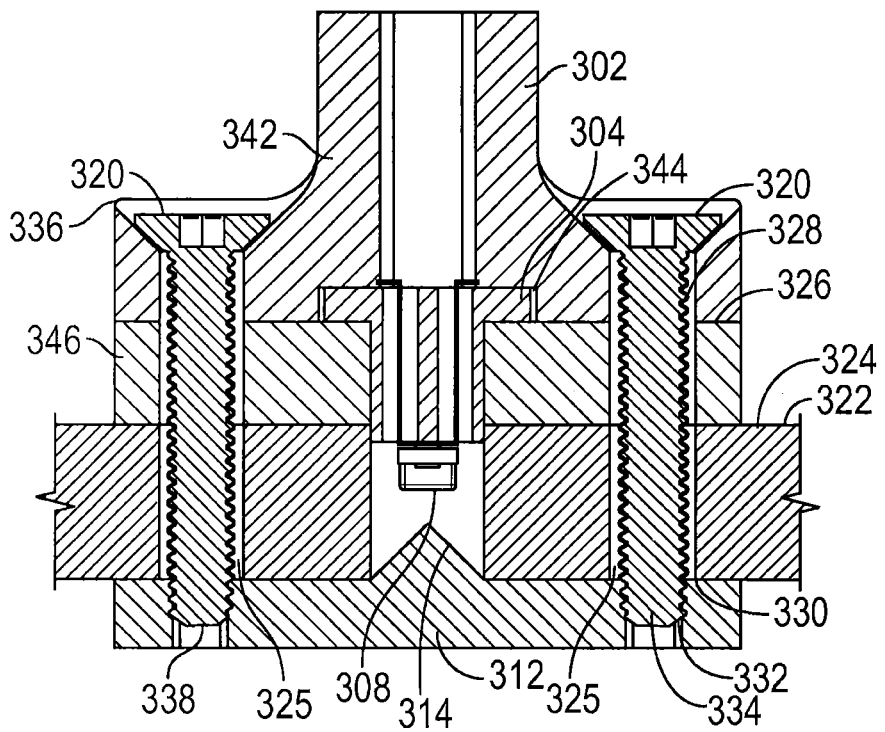
FIG. 17 is a cross-sectional view of the still further LED support structure of FIG. 16 as used in a luminaire.
Figure 18:
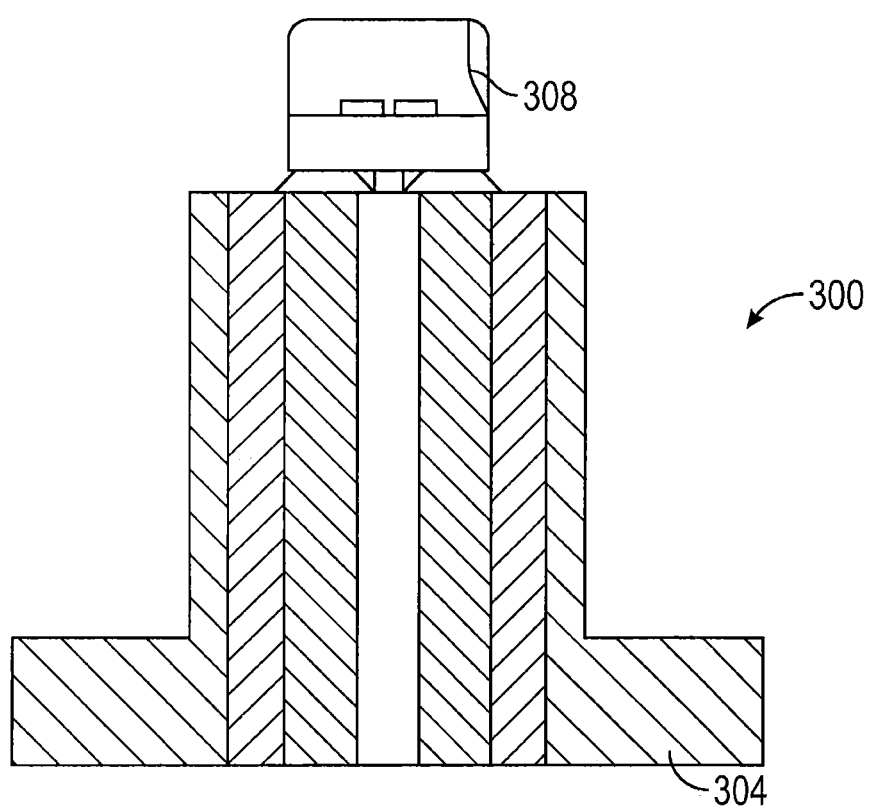
FIG. 18 is an enlarged, fragmentary, side elevational view of a portion of the embodiment of FIG. 16 shown in an inverted position.
Figure 19:
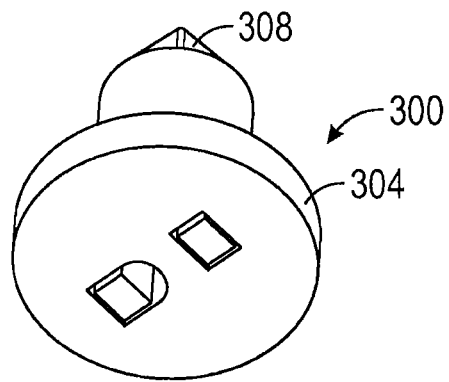
FIG. 19 is a further isometric view of the still further LED support structure of FIG. 16.

The LED support structure is secured in the first cap assembly 302, as shown in FIG. 17. In this embodiment, the first cap assembly 302 includes a first member 342 having a counter-bore 344 in which the base member 304 of the LED support structure 300 is positioned. An intermediate member 346 of the first cap assembly 302 is positioned between the first member 342 and the waveguide 322 and captures the base member 304 to the first member 342. A second cap assembly 312 having a conic portion 314 is disposed opposite the LED element 308.

This conic portion 314 may be similar to any of the plug members disclosed above. The LED element is mounted on an axial end surface of the LED mounting member such that electrodes of the LED element are electrically connected to conductors that extend through passages in the LED mounting member.

In an embodiment as seen in FIG. 17, fasteners 320 secure the upper and lower cap assemblies 302, 312 to a waveguide 322 and to each other. In still another embodiment, the waveguide 322 includes one or more surfaces 324 that define at least one through hole 325, the first cap assembly 302 has one or more surfaces 326 that define at least one through hole 328 that is aligned with the waveguide through hole 325, the second cap assembly 312 includes one or more surfaces 330 that define at least one through hole 332 that is aligned with both the waveguide and first cap assemblies 325, 328 and at least one fastener 320 extends through the aligned waveguide, first cap assembly, and lower cap assembly through holes 325, 328, and 332 so as to secure the first and second cap assemblies 302, 312 to the waveguide 322.

The through holes 332 fabricated for the fasteners 320 may have a non-cylindrical cross-section that incorporates facets or curves so as to minimize the amount of light entering the fastener through hole 332 and impinging on the fastener 320. Appropriate facets would utilize TIR or refraction to re-direct light from entering the fastener through hole 332.

In yet another embodiment, the fastener 320 has a first end 336, a second end 338 and an intermediate section 340 located between the first 336 and the second end 338. In this particular embodiment, a portion of the intermediate section 340 surrounded by the waveguide 322 when the fastener 320 secures the first and the second cap assemblies 302, 312 to the waveguide 322 is made of an optically transparent material.

Figure 20:
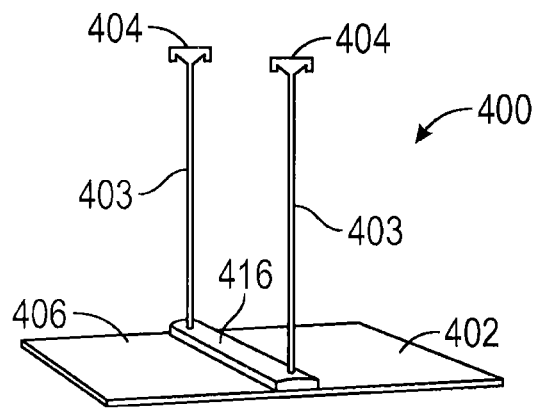
FIG. 20 is a perspective of another embodiment of a luminaire disclosed in the application.

Disclosed in FIG. 20 is a luminaire 400 having a waveguide 402, such as a square pendant, suspended using one or more rods, cables, wire ropes 403, or the like, beneath a mounting element 404. The waveguide 402 includes a first surface 406 proximal to the mounting element 404 and a second surface 408 distal to the mounting element 404. A plurality of cavities 410 extends through the waveguide 402 from the first surface 406 to the second surface 408. A plurality of LED components 412 are connected to a printed circuit board 414 that is attached to a first bar assembly 416. Each of these LED components 412 is coupled to the first surface 406 of the waveguide 402 so as to emit light into the respective cavity 410 in which they are positioned.

Figure 21:
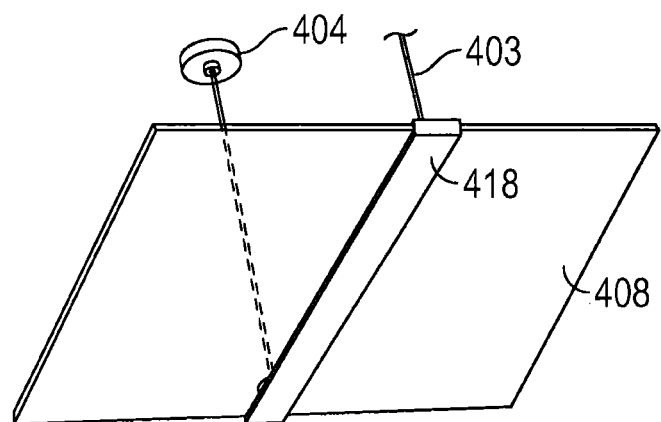
FIG. 21 is perspective showing a lower surface of the embodiment of FIG. 20.
Figure 22:
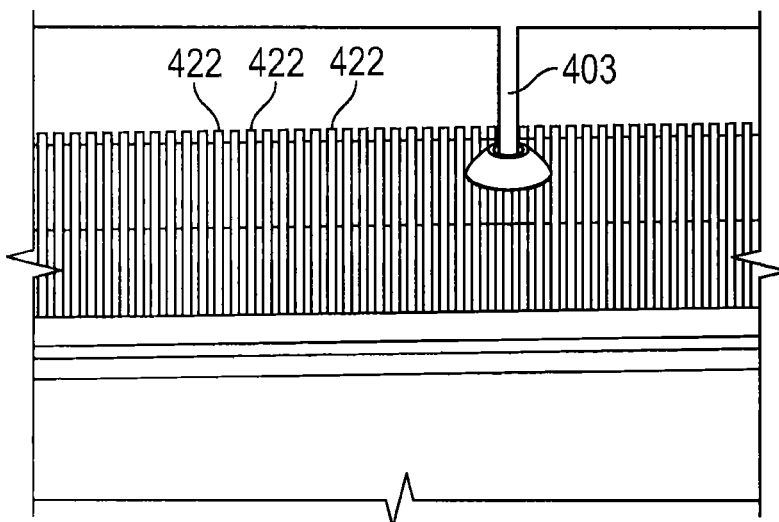
FIG. 22 is an enlarged, fragmentary perspective of a first bar assembly used with an embodiment of a luminaire disclosed in the application.

In an embodiment, a second bar assembly 418 is connected to the second surface 408 of the waveguide 402, as shown in FIG. 21. The second bar assembly 418 includes a plurality of conic reflector elements 420, wherein each reflector element 420 is aligned with one of the plurality of LED components 412 in a respective one of the plurality of cavities 410. The second bar assembly 418 may be connected to the first bar assembly 416. In a particular embodiment, the first bar assembly 416 is clamped to the second bar assembly. In yet another embodiment, the first bar assembly 416 includes a plurality of appendages 422, as shown in FIG. 22, that act as heat sinks.

Figure 23:
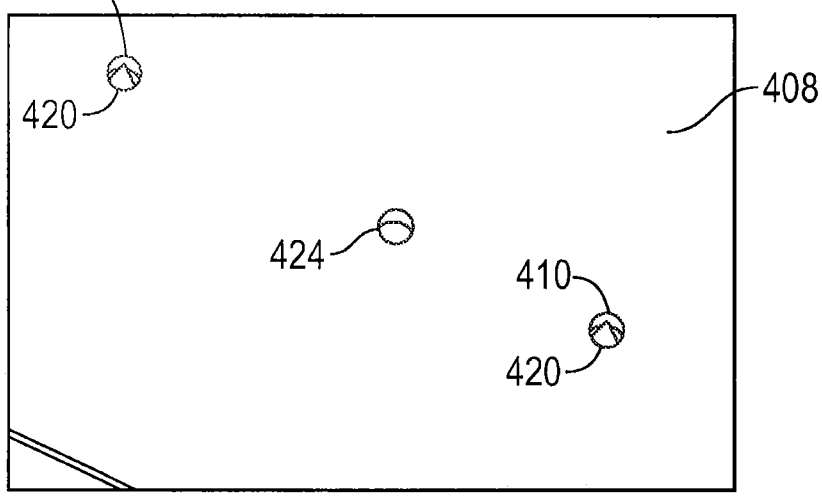
FIG. 23 is an enlarged, fragmentary, isometric view of a pair of coupling cavities with a further cavity disposed therebetween.
Figure 24:
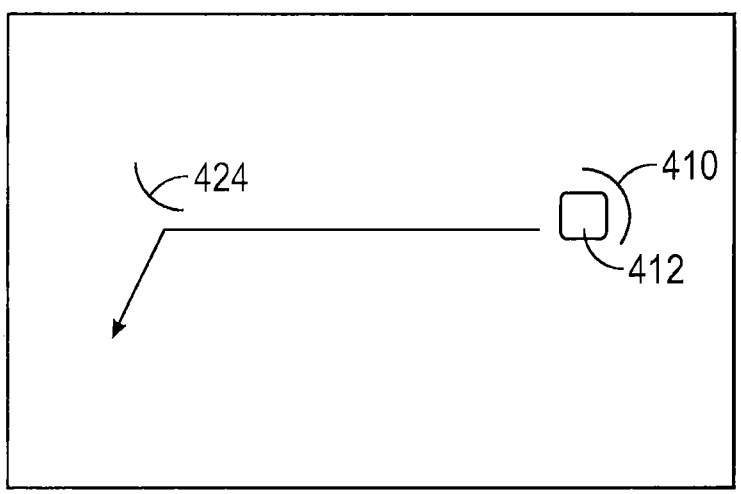
FIG. 24 is a diagram showing a light wave emitted from an LED in the embodiment of FIG. 23.
Figure 25:
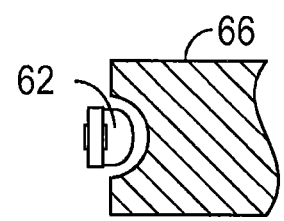
FIG. 25 is a sectional view showing an LED mounted at the edge of the waveguide.

In an embodiment, a faceted or shaped through hole 424 or other light redirection feature is located between at least two of the plurality of cavities 410, as shown in FIG. 23. These cavities 410 utilize TIR or refraction or scattering to divert rays such that light emitting from one cavity is not incident on an adjacent cavity, where it may be absorbed, as shown in FIG. 24. The through hole, 424, shown in the illustrated embodiment could be a through hole 424 that extends either partially or fully through the waveguide body 402. In another embodiment, the through hole 424 may be internally positioned within the waveguide. When a through hole 424 extends fully through the waveguide 402, it may be used as an attachment point. The facets or geometry of the through hole 424 redirecting feature could be used to prevent light from impinging on and being absorbed by a fastener (not shown) such as a screw which extends from the first bar 416 to the second bar 418 through the faceted hold 424 in the waveguide 402.

INDUSTRIAL APPLICABILITY

In summary, it has been found that when using a single color or multicolor LED element in a luminaire, it is desirable to mix the light output developed by the LEDs thoroughly so that the intensity and/or color appearance emitted by the luminaire is uniform. When the LED element is used with a waveguide, opportunities have been found to exist to accomplish such mixing during the light coupling and light guiding or distributing functions. Specifically, bending the light rays by refraction can result in improvement in mixing. In such a case, this refractive bending can be accomplished by providing interfaces in the waveguide between materials having different indices of refraction. These interfaces may define coupling features where light developed by the LED elements enters the waveguide and/or light redirection features at portions intermediate the coupling features and waveguide extraction features or areas where light is otherwise extracted (such as by bends) from the waveguide. It has further been found that directing light into a wide range of refraction angles enhances light mixing. Because the angle $A_r$ of a refracted light ray is a function of the angle $A_i$ between the incident light ray and the interface surface struck by the incident light ray (with refractive angle $A_r$ increasing as $A_i$ approaches zero, i.e., when the incident light ray approaches a parallel condition with respect to the interface surface), a wide range of refracted light ray angles can be obtained by configuring the interface surfaces to include a wide range of angles relative to the incident light rays. This, in turn, means that the interfaces could include a significant extent of interface surfaces that are nearly parallel to the incident light rays, as well as other surfaces disposed at other angles to the incident light rays. Overall waveguide shapes and coupling feature and redirection feature shapes such as curved (including convex, concave, and combinations of convex and concave surfaces), planar, non-planar, tapered, segmented, continuous or discontinuous surfaces, regular or irregular shaped surfaces, symmetric or asymmetric shapes, etc. can be used, it being understood that, in general, light mixing (consistent with the necessary control over light extraction) can be further improved by providing an increased number of interface surfaces and/or more complex interface shapes in the light path. Also, the spacing of coupling features and light redirection features affect the degree of mixing. In some embodiments a single light coupling feature and/or a single light redirection feature may be sufficient to accomplish a desired degree of light mixing. In other embodiments, multiple coupling features and/or multiple light redirection features might be used to realize a desired degree of mixing. In either event, the shapes of multiple coupling features or multiple redirection features may be simple or complex, they may be the same shape or of different shapes, they may be equally or unequally spaced, or distributed randomly or in one or more arrays (which may themselves be equally or unequally spaced, the same or different size and/or shape, etc.) Further, the interfaces may be disposed in a symmetric or asymmetric pattern in the waveguide, the waveguide itself may be symmetric or asymmetric, the waveguide may develop a light distribution that is symmetric, asymmetric, centered or non-centered with respect to the waveguide, the light distribution may be on-axis (i.e., normal to a face of the waveguide) or off-axis (i.e., other than normal with respect to the waveguide face), single or split-beam, etc.

Still further, one or more coupling features or redirection features, or both, may be disposed anywhere inside the waveguide, at any outside surface of the waveguide, such as an edge surface or major face of the waveguide, and/or at locations extending over more than one surface or portion of the waveguide. Where a coupling or light redirection feature is disposed inside the waveguide, the feature may be disposed in or be defined by a cavity extending fully through the waveguide or in or by a cavity that does not extend fully through the waveguide (e.g., in a blind bore or in a cavity fully enclosed by the material of the waveguide). Also, the waveguide of any of the embodiments disclosed herein may be planar, non-planar, irregular-shaped, curved, other shapes, suspended, etc.

While specific coupling feature and light redirection feature parameters including shapes, sizes, locations, orientations relative to a light source, materials, etc. are disclosed as embodiments herein, the present invention is not limited to the disclosed embodiments, inasmuch as various combinations and all permutations of such parameters are also specifically contemplated herein. Thus, any one of the coupling cavities, plug members, LED elements, masking element(s), redirection features, extraction features, etc. as described herein may be used in a luminaire, either alone or in combination with one or more additional elements, or in varying combination(s) to obtain light mixing and/or a desired light output distribution. More specifically, any of the features described and/or claimed in U.S. patent application Ser. No. 13/842,521 (now U.S. Pat. No. 9,519,095), U.S. patent application Ser. No. 13/839,949 (now U.S. Pat. No. 9,581,751), U.S. patent application Ser. No. 13/841,074, filed Mar. 15, 2013, entitled "Optical Waveguide Body" (now U.S. Pat. No. 9,625,638), U.S. patent application Ser. No. 13/840,563 (U.S. Publication No. 2014/0211495, published Jul. 31, 2014), U.S. patent application Ser. No. 14/101,099, filed Dec. 9, 2013 (now U.S. Pat. No. 9,411,086), entitled "Optical Waveguide Assembly and Light Engine Including Same", U.S. patent application Ser. No. 14/101,132, filed Dec. 9, 2013 (now U.S. Pat. No. 9,442,243), entitled "Waveguide Bodies Including Redirection Features and Methods of Producing Same", U.S. patent application Ser. No. 14/101,147, filed Dec. 9, 2013 (now U.S. Pat. No. 9,869,432), entitled "Luminaires Using Waveguide Bodies and Optical Elements", and U.S. patent application Ser. No. 14/101,051, filed Dec. 9, 2013 (now U.S. Pat. No. 9,366,396), entitled "Optical Waveguide and Lamp Including Same", incorporated by reference herein and owned by the assignee of the present application, may be used in the devices disclosed herein. Thus, for example, any of the waveguides or luminaires disclosed herein may include one or more coupling features or optics, a modified LED arrangement, one or more light redirection features, one or more extraction features, and/or particular waveguide or overall luminaire shapes and/or configurations as disclosed in such applications, as necessary or desirable. Other luminaire and waveguide form factors than those disclosed herein are also contemplated.

The coupling features disclosed herein efficiently couple light into the waveguide, and the redirection features uniformly mix light within the waveguide and the light is thus conditioned for uniform extraction out of the waveguide. At least some of the luminaires disclosed herein are particularly adapted for use in installations, such as, replacement or retrofit lamps (e.g., LED PAR bulbs), outdoor products (e.g., streetlights, high-bay lights, canopy lights), and indoor products (e.g., downlights, troffers, a lay-in or drop-in application, a surface mount application onto a wall or ceiling, etc.) preferably requiring a total luminaire output of at least about 800 lumens or greater, and, more preferably, a total luminaire output of at least about 3000 lumens, and most preferably a total lumen output of about 10,000 lumens. Further, the luminaires disclosed herein preferably have a color temperature of between about 2500 degrees Kelvin and about 6200 degrees Kelvin, and more preferably between about 2500 degrees Kelvin and about 5000 degrees Kelvin, and most preferably about 2700 degrees Kelvin. Also, at least some of the luminaires disclosed herein preferably exhibit an efficacy of at least about 100 lumens per watt, and more preferably at least about 120 lumens per watt, and further exhibit a coupling efficiency of at least about 92 percent. Further, at least some of the luminaires disclosed herein preferably exhibit an overall efficiency (i.e., light extracted out of the waveguide divided by light injected into the waveguide) of at least about 85 percent. A color rendition index (CRI) of at least about 80 is preferably attained by at least some of the luminaires disclosed herein, with a CRI of at least about 88 being more preferable. A gamut area index (GAI) of at least about 65 is achievable. Any desired particular output light distribution, such as a butterfly light distribution, could be achieved, including up and down light distributions or up only or down only distributions, etc.

When one uses a relatively small light source which emits into a broad (e.g., Lambertian) angular distribution (common for LED-based light sources), the conservation of etendue, as generally understood in the art, requires an optical system having a large emission area to achieve a narrow (collimated) angular light distribution. In the case of parabolic reflectors, a large optic is thus generally required to achieve high levels of collimation. In order to achieve a large emission area in a more compact design, the prior art has relied on the use of Fresnel lenses, which utilize refractive optical surfaces to direct and collimate the light. Fresnel lenses, however, are generally planar in nature, and are therefore not well suited to re-directing high-angle light emitted by the source, leading to a loss in optical efficiency. In contrast, in the present invention, light is coupled into the optic, where primarily TIR is used for re-direction and collimation. This coupling allows the full range of angular emission from the source, including high-angle light, to be re-directed and collimated, resulting in higher optical efficiency in a more compact form factor.

Embodiments disclosed herein are capable of complying with improved operational standards as compared to the prior art as follows:

| | State of the art standards | Improved Standards Achievable by Present Embodiments |
|---|---|---|
| Input coupling efficiency (coupling + waveguide) | 90% | About 95% plus improvements through color mixing, source mixing, and control within the waveguide |
| Output efficiency (extraction) | 90% | About 95%: improved through extraction efficiency plus controlled distribution of light from the waveguide |
| Total system | ~80% | About 90%: great control, many choices of output distribution |

In at least some of the present embodiments, the distribution and direction of light within the waveguide is better known, and hence, light is controlled and extracted in a more controlled fashion. In standard optical waveguides, light bounces back and forth through the waveguide. In the present embodiments, light is extracted as much as possible over one pass through the waveguide to minimize losses.

In some embodiments, one may wish to control the light rays such that at least some of the rays are collimated, but in the same or other embodiments, one may also wish to control other or all of the light rays to increase the angular dispersion thereof so that such light is not collimated. In some embodiments, one might wish to collimate to narrow ranges, while in other cases, one might wish to undertake the opposite.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

We claim:

1. An LED support structure for use with a cavity in a waveguide made of optically transmissive material, the LED support structure comprising:
   an LED support structure defining a first surface;
   a plurality of LED devices mounted on the first surface;
   an elongate reflective member extending outwardly from the LED support structure beyond the plurality of LED devices; and
   a reflective element attached to an end of the elongate reflective member opposite the first surface, wherein at least one of the reflective element and the LED support structure is connected to the elongate reflective member such that a portion of the waveguide is captured between the reflective element and the LED support structure.

2. The LED support structure of claim 1 wherein the LED support structure comprises a housing supporting the first surface, wherein the housing includes a plurality of appendages that act as a heat sink.

3. The LED support structure of claim 2, wherein the appendages comprise fins.

4. The LED support structure of claim 1, wherein the LED support structure is inserted into the cavity in the waveguide.

5. The LED support structure of claim 1, wherein the cavity forms an indent in the waveguide and the indent is shaped to accommodate the reflective element.

6. The LED support structure of claim 5, wherein a reflective coating is applied to the indent.

7. The LED support structure of claim 1, wherein the elongate reflective member has a triangular cross section.

8. The LED support structure of claim 1, wherein:
   the elongate reflective member defines a void therein; and
   a fastener is inserted into the void.

9. An LED support structure for use with a waveguide having a cavity, the LED support structure comprising:
   a first cap assembly configured to be mounted to a first surface of the waveguide, the first cap assembly comprising a base member; a LED mounting member extending from the base member; and at least one LED mounted on an end of the LED mounting member distal to the base member such that the at least one LED emits light into the cavity;
   a second cap assembly configured to be mounted to a second surface of the waveguide, the second cap assembly comprising an at least partially reflective surface positioned to receive light emitted into the cavity;
   a fastener engageable with the first cap assembly and the second cap assembly such that the waveguide is captured between the first cap assembly and the second cap assembly.

10. The LED support structure of claim 9 wherein the at least partially reflective surface comprises a conic portion opposite the LED mounting member.

11. The LED support structure of claim 9, wherein:
    the waveguide defines a first through hole;
    the first cap assembly defines a second through hole that is aligned with the first through hole;
    the second cap assembly defines a third through hole that is aligned with the first through hole and the second through hole; and
    wherein the fastener extends through the first through hole, the second through hole and the third through hole to secure the first and second cap assemblies to the waveguide.

12. The LED support structure of claim 9, wherein:
    the fastener has a first end, a second end, and an intermediate section located between the first and the second end; and
    a portion of the intermediate section is surrounded by the waveguide when the fastener engages the first cap assembly and the second cap assembly.

13. A luminaire comprising:
    a waveguide made of optically transmissive material suspended distal to a mounting element, said waveguide having a first surface proximal to the mounting element, a second surface distal to the mounting element, and an edge between the first and the second surfaces;
    a plurality of cavities extending into the waveguide from the first surface to the second surface; and
    a plurality of LED components connected to a first bar assembly, said plurality of LED components being arranged to emit light into the plurality of cavities, wherein the first bar assembly is mounted adjacent the first surface of the waveguide.

14. The luminaire of claim 13 further comprising:
    a second bar assembly connected to the second surface of the waveguide; and
    said second bar assembly having at least one conic reflector element, wherein the at least one conic reflector element is aligned with the plurality of LED components in the at least one cavity.

15. The luminaire of claim 14, wherein the first bar assembly is connected to the second bar assembly.

16. The luminaire of claim 13, wherein the first bar assembly includes a plurality of appendages that act as heat sinks.

17. The luminaire of claim 13, wherein a through hole is located between at least two of the plurality of cavities.

18. The luminaire of claim 13, wherein at least the first surface includes a plurality of extraction features.

19. An LED support structure for use in a cavity in a waveguide, the LED support structure comprising:
- a first cap assembly comprised of:
  - a base member; a LED mounting member extending from the base member; and
  - at least one LED mounted on an end of the mounting member distal to the base member;
- a second cap assembly having a conic portion opposite the LED mounting member;
- wherein:
- the waveguide defines at least one through hole;
- the first cap assembly defines at least one through hole that is aligned with the waveguide through hole;
- the second cap assembly defines at least one through hole that is aligned with both the waveguide through hole and the first cap assembly through hole; and
- a fastener extends through the, respective, waveguide, first cap assembly, and second cap assembly through holes so as to secure the first and second cap assemblies to the waveguide.

\* \* \* \* \*